(12) United States Patent
Cardenas Gasca et al.

(10) Patent No.: US 12,470,678 B2
(45) Date of Patent: Nov. 11, 2025

(54) SYSTEMS AND METHODS FOR BODY-DRIVEN INTERACTIONS IN THREE-DIMENSION LAYERED IMAGES

(71) Applicant: Adobe Inc., San Jose, CA (US)

(72) Inventors: Ana Maria Cardenas Gasca, Bogota (CO); Stephen DiVerdi, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 163 days.

(21) Appl. No.: 18/134,831

(22) Filed: Apr. 14, 2023

(65) Prior Publication Data

US 2024/0348763 A1     Oct. 17, 2024

(51) Int. Cl.

| H04N 13/395 | (2018.01) |
| G06T 3/40 | (2006.01) |
| G06T 15/00 | (2011.01) |
| G06V 10/74 | (2022.01) |
| G06V 40/20 | (2022.01) |
| G10L 15/22 | (2006.01) |

(Continued)

(52) U.S. Cl.
CPC ............ *H04N 13/117* (2018.05); *G06T 3/40* (2013.01); *G06T 15/00* (2013.01); *G06V 10/761* (2022.01); *G06V 40/20* (2022.01); *G10L 15/22* (2013.01); *H04N 13/282* (2018.05); *G10L 2015/223* (2013.01)

(58) Field of Classification Search
CPC .. H04N 13/117; H04N 13/282; H04N 13/395; G06T 3/40; G06T 15/00; G06V 10/761; G06V 40/20; G10L 15/22; G10L 2015/233; G06F 3/017; G06F 3/167
See application file for complete search history.

(56) References Cited

U.S. PATENT DOCUMENTS 11,282,404 B1 * 3/2022 Yang ................... G06F 3/013
11,423,549 B2   8/2022 Saquib et al.

(Continued)

OTHER PUBLICATIONS

OBS Studio Contributors, "OBS Studio" available at https://obsproject.com/, Feb. 2023, 8 pages.

(Continued)

*Primary Examiner* — Xiao M Wu
*Assistant Examiner* — George Renze
(74) *Attorney, Agent, or Firm* — Kilpatrick Townsend & Stockton LLP

(57) ABSTRACT

Methods and systems disclosed herein relate generally to body-driven interactions with three-dimensional (3D) layered graphics. The system includes a video capture module that can receive a video stream. The video stream may depict a subject and a 3D layered image, in which the 3D layered image has an associated viewpoint. The system may also include a video processing module that can identify one or more actions performed by the subject. The video processing module can determine a transform operation to be applied to the viewpoint. The transform operation may include at least one of changing the zoom level of the viewpoint, moving the location of the viewpoint, and changing the direction of the viewpoint. The video processing module may apply the transform operation to the 3D layered image and then render the transformed 3D layered image on the video stream.

20 Claims, 14 Drawing Sheets

(51) Int. Cl.
*H04N 13/117* (2018.01)
*H04N 13/282* (2018.01)

(56) References Cited

U.S. PATENT DOCUMENTS

| | | | | |
|---|---|---|---|---|
| 2023/0139889 | A1* | 5/2023 | Sakurabu | G06V 10/761 |
| | | | | 382/106 |
| 2023/0305633 | A1* | 9/2023 | Wagner | G06F 3/167 |
| 2024/0061547 | A1* | 2/2024 | Fleizach | G06F 3/013 |
| 2024/0305760 | A1* | 9/2024 | Takeda | G06T 7/20 |
| 2024/0314279 | A1* | 9/2024 | Ogura | H04N 21/6587 |
| 2024/0346792 | A1* | 10/2024 | Kundu | G06T 7/73 |

OTHER PUBLICATIONS

PREZI "The Best wat to Engage and Connect at the Office", available at https://prezi.com/, 2023, 3 pages.
MMHMM, "Impress People Over Video", available at https://www.mmhmm.app/home. 2023, 8 pages.
Canva, "What Will You Design Today?", available at https://www.canva.com/, 2023, 6 pages.
Derivative, Touchdesigner, Welcome to Derivative. Nice to Meet You, available at https://derivative.ca/about-derivative, 2017, 3 pages.
Resolume, "Introducing Resolume Wire", available at https://resolume.com/, 2023, 3 pages.
Mental Canvas, "Reimaging Drawing for the Digital Age", available at https://mentalcanvas.com/, 2016, 5 pages.
Liao, Jian, et al., "RealityTalk: Real-Time Speech-Driven Augmented Presentation for AR Live Storytelling"The 35th Annual ACM Symposium on User Interface Software and Technology (UIST '22), Oct. 29-Nov. 2, 2022, arXiv:2208.06350v1 Aug. 12, 2022, 13 pages.
Hall, Brian D., et al.., "Augmented Chironomia for Presenting Data to Remote Audiences", ACM Symposium on User Interface Software and Technology (UIST '22), Oct. 29-Nov. 2, 2022, arXiv:2208.04451v1, Aug. 8, 2022, 14 pages.

* cited by examiner

```
424 ~ OnDollyTrigger:
        startDist =dist(RHandTransform, LHandTransform)

426 ~ OnAnimate:
        newDist = dist(RHandTransform, LHandTransform)
        zoomDir = newDistance / startDist
        if (zoomScale > 1) {
          camera.z = camera.z + zoomFactor;
        } else {
          camera.z = camera.z – zoomFactor;
        }
```

```
532 —— OnTrigger:
         FollowFace = true

534 —— OnAnimate:
         if (FollowFace) {
           Camera.lookAt(headTransform)
         }
```

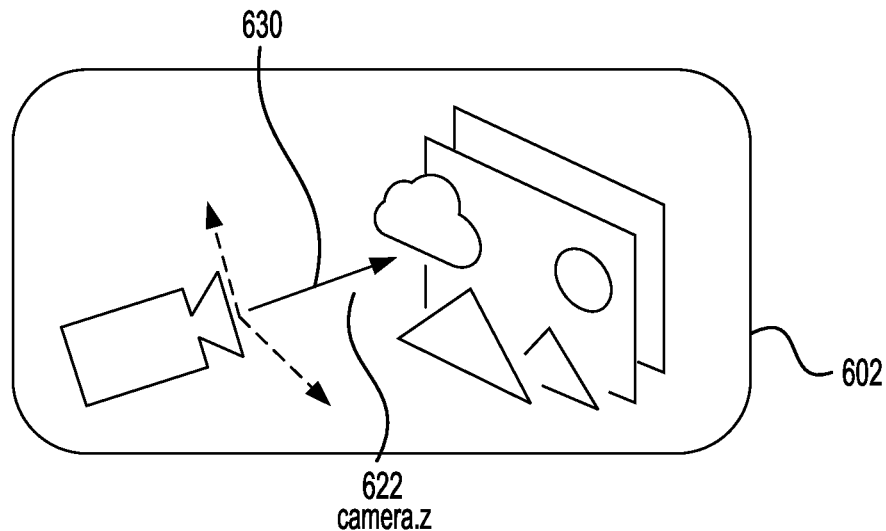

FIG. 6C

```
642 ~ OnTrigger:
        prevFrameDistH = dist(RET, LET)
        prevFrameDistH = dist(FT, MYT)
        Animate()

644 ~ OnAnimate:
        hDelta = prevFrameDistH – currFrameDistH;
        vDelta = prevFrameDistH – currFrameDistV;
        maxV = max(prevFrameDistV, currFrameDistV);
        minV = min(prevFrameDistV, currFrameDistV);
        maxH = max(prevFrameDistH, currFrameDistH);
        minH = min(prevFrameDistH, currFrameDistH);
        if (minV/ maxV < vThreshold & & minH / maxH < hThreshold) {
            if ((vDelta +hDelta) /2 > 0) {
              camera.z = camera.z + zoomFactor;
            } else {
              camera.z = camera.z – zoomFactor;
            }
        }
        prevFrameDistH = currFrameDistH;
        prevFrameDistV = currFrameDistV;
```

FIG. 6D

732 — OnTrigger:
  SceneSpec = scenesDefinitions[trigger];
  Animate()

734 — OnAnimate:
  camera.Position.lerp(SceneSpec.CameraPos)
  Camera.LookAt(SceneSpec.CameraLookAt)

FIG. 7C

SYSTEMS AND METHODS FOR BODY-DRIVEN INTERACTIONS IN THREE-DIMENSION LAYERED IMAGES

TECHNICAL FIELD

This disclosure generally relates to video processing and artificial reality. More specifically, but not by way of limitation, this disclosure relates to control of real-time, graphic-enhanced video stream being displayed on a graphical user interface.

BACKGROUND

Interactive augmented video tools enable content creators to work more efficiently to produce video by combining different stages of video production, namely, performance and post-production. For example, a content creator can be a video's subject while simultaneously triggering visual effects corresponding to their performance using body tracking and voice recognition technologies. Video content can then be further enhanced in post-production. However, live presentations cannot be edited in post-production, as the live video stream would have been already presented to the target audience. Therefore, during live presentations, visual effects must be created and manipulated by the content creator during video capture.

Three-dimensional (3D) visual effects during live presentations may present a particular challenge. Navigating 3D content using traditional input modalities like the keyboard and the mouse can be difficult. Video content that combines navigation through 3D graphics driven by the content creator's gestures requires a 3D production pipeline that produces a rendering of the 3D scene and composites the actor into the scene using specialized video editing software. This approach is limited to post-production and would be difficult to be implemented in live presentations.

SUMMARY

Certain embodiments involve employing body-driven interactions in three-dimension layered images. A video capture module receives a video stream being presented on a display device. The video stream depicts a subject and one or more three-dimensional (3D) layered images in a 3D space, each 3D layered image having an associated viewpoint. Each viewpoint has a location, a direction, and a zoom level in the 3D space. A video processing module applies a machine-learning model to the video stream to identify one or more actions performed by the subject. The video processing module determines, from the one or more actions, a transform operation to a particular 3D layered image of the one or more 3D layered images. The particular 3D image has a first viewpoint, in which the transform operation updates the first viewpoint to a second viewpoint. Updating the first viewpoint includes at least one of changing the zoom level of the first viewpoint to a zoom level of the second viewpoint, moving the location of the first viewpoint to a location of the second viewpoint, and changing the direction of the first viewpoint to a direction of the second viewpoint. The video processing module applies the transform operation to the particular 3D layered image to generate a transformed 3D layered image, in which the transformed 3D layered image is configured to be rendered from the perspective of the second viewpoint. The video processing module renders the transformed 3D layered image on the video stream.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 6A-D show illustrations of an action used in some example systems for body-driven interactions in 3D layered images, according to some aspects of the present disclosure.

FIGS. 7A-C show illustrations of an action used in some example systems for body-driven interactions in 3D layered images, according to some aspects of the present disclosure.

DETAILED DESCRIPTION

Figure 1A:
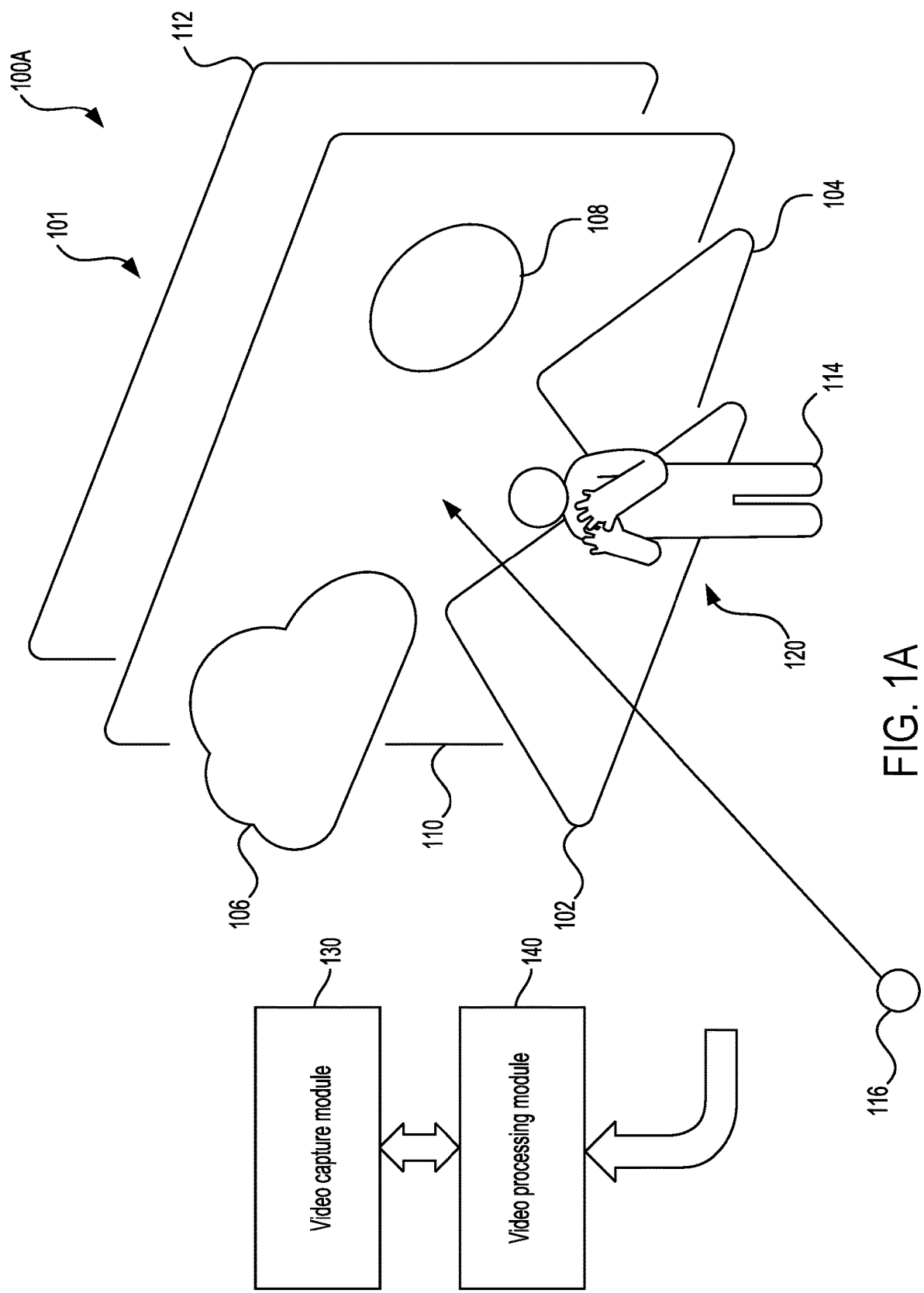
FIGS. 1A-B show illustrations of example environments employing body-driven interactions in three-dimension (3D) layered images.

Conventionally, content creators use post-processing techniques to apply visual effects congruent with the subject's performance in timing, content, and visual positioning. This process is manual and time-consuming and requires careful scripting of the subject's performance. However, live presentations cannot be edited in post-production. During live presentations, visual effects must be created and manipulated by the content creator during video capture.

Some existing methods enable content creators to create live presentations that animate two-dimensional (2D) content triggered by hand and body gestures. However, three-dimensional (3D) visual effects during live presentations may present a different challenge. For example, navigating 3D content using traditional input modalities like the keyboard and the mouse can be difficult. Video content that combines navigation through 3D graphics driven by the content creator's gestures requires a 3D production pipeline that produces a rendering of the 3D scene and composites the actor into the scene using specialized video editing software. This approach is limited to post-production and therefore cannot be used to augment live presentations. Thus, a method is needed to create live presentations that give the content creator the ability to control 3D visual effects during the authoring stage.

Certain embodiments described herein can address these problems by providing systems and methods for body-driven interactions with 3D layered graphics. A 3D layered image may be composed of 2D graphics that can be mapped to arbitrary points in space. The 2D graphics can be presented on layered planes to visually form a 3D image. An image representing a subject can be superimposed in front of or among the 2D layers, creating the impression that the subject is a part of the 3D layered image when projected on a 2D plane. Thus, combined with a technique for body-driven navigation among and within layers, the content creator can create the effect of motion within a 3D scene using 3D layered graphics during live video presentations. In certain embodiments, a subject can showcase a scene by using gestures to navigate the 3D layered environment that takes the audience from scene to scene.

For example, a system for body-driven interactions in three-dimension layered images may include a video capture module. The video capture module may be configured to receive a video stream being presented on a display device, the video stream depicting a subject and one or more 3D layered images in a 3D space. In some instances, each 3D layered image includes an associated viewpoint, each viewpoint having a location, direction, and zoom level in the 3D space. The video capture module may be communicatively coupled to one or more cameras configured for generating a new video stream.

As an illustrative example, the video capture module can receive a video stream that depicts a subject in front of a 3D layered image that represents a mountain and a cloud in front of a landscape. The subject may be embedded in front of or among the 2D layers making up the 3D layered image using chroma keying or other suitable method. The 3D layered image may be made up layered 2D planes. The first 2D plane represents the mountain, the second 2D plane represents the cloud, and the third 2D plane represents a landscape. The 3D layered image is rendered from the perspective of a viewpoint. The 2D planes are located at different distances from the viewpoint in the 3D space, such that the layered 2D planes together depict a 3D scene having depth. When rendered on the video stream, the 3D layered image depicts a 3D scene including a mountain and a cloud in front a landscape, each object having an apparent depth corresponding to their distance from the viewpoint.

During the video stream, including during live video streams, the subject may desire to transform the zoom level, location, direction of the viewpoint of the 3D layered image in the 3D space. In some instances, the subject may wish to change apparent positions within the 3D space, by changing the location of the viewpoint. The apparent position changes may include both lateral changes (changes that do not affect the apparent depth) and changes in depth with respect to the 2D layer(s) currently visible. Continuing the above example, the embedded subject may want to relocate the mountain image from a left-top portion of the video stream to a right-bottom portion of the video stream. In another example, the subject may wish to change the direction of the viewpoint, so that the mountain and cloud represented in the 3D layered image appear in the video stream from a different apparent direction. In both cases, the subject may desire to remain fixed in space while the apparent virtual camera orientation changes around him or her. Some embodiments of the present disclosure may provide for changing the location, direction, or zoom level of the viewpoint using body-driven interactions.

The system may include a video processing module. The video processing module may apply a machine learning ("ML") model to the video stream to identify one or more actions performed by the subject. For example, the video processing module may include a trained ML model. The ML model may be trained to localize, detect, and/or classify images in a video stream. Continuing the above example, the subject may desire to make the camera "zoom in" by affecting a change in the location of the viewpoint. The ML model may identify the subjects's hands and furthermore determine that the subject's hands are initially spaced a distance apart. The ML model may then detect the subjects's hands moving apart to some new, greater distance. The initial spacing together with the change in spacing may constitute an action. In this example, the subject's action is analogous to the "pinch to zoom" effect familiar from devices like smartphones and tablets. Thus, the subject's action may be indicative of the subject's desire to change the apparent zoom level or location of the viewpoint with respect to the rendered 3D layered image. For instance, the subject may desire to zoom in to the cloud depicted in the 3D layered image such that the cloud is enlarged and visible, while the mountain is no longer visible.

The video processing module may determine, from the one or more actions, a transform operation to a particular 3D layered image of the one or more 3D layered images. The particular 3D image is associated with a first viewpoint, in which the transform operation updates the first viewpoint of the particular 3D layered image to a second viewpoint. Continuing the example above, the video processing module may compare the initial spacing of the subject's hands with the final, greater spacing to determine that the action corresponds to a transform operation. In this example, the corresponding transform operation is changing the location of the viewpoint from a distant point in 3D space to a closer point in 3D space. A similar effect can be created by increasing the zoom level of the viewpoint, while keeping the viewpoint stationary.

Transforming the first viewpoint to the second viewpoint may include at least one of changing the zoom level of the first viewpoint to a zoom level of the second viewpoint, moving the location of the first viewpoint to a location of the second viewpoint, or changing the direction of the first viewpoint to a direction of the second viewpoint. Continuing the example above, the video processing module may determine that changing the location of the viewpoint includes a linear translation from a point in the 3D space to a point closer to the subject in 3D space. Other example actions may involve changing only the direction or zoom level of the viewpoint. Still other examples may involve changing a combination of viewpoint location, zoom level, or location.

The video processing module may apply the transform operation to the particular 3D layered image to generate a transformed 3D layered image. In some instances, the transformed 3D layered image is configured to be rendered from the perspective of the second viewpoint. For example, application of the transform operation to the viewpoint may include one or more mathematical operations that translate, scale, or rotate the 3D layered image in one or more memory devices. For instance, the 3D layered image as currently rendered on the video stream may reside in volatile computer memory. In above example of the "zoom in" action, the linear translation of the viewpoint may correspond to a mathematical translation operation on the coordinates of the viewpoint. The video processing module may translate the viewpoint along a line towards the subject in 3D space such that the final position of the viewpoint is past the first 2D layer containing the mountain.

The video processing module may render the transformed 3D layered image on the video stream. Completing the example above, the 3D layered image is rendered from the perspective of the final, translated second position of the viewpoint. The re-rendered 3D layered image may be updated on the video stream. As reflected in the video stream, the camera appears to "zoom in" on the subject in response to the subject's action, past the mountain such that the cloud is enlarged and visible, while the mountain is no longer visible. A viewer of the video stream has the impression that the camera has "zoomed in" in response to the bimanual motion of the subject's hands.

Some embodiments of the present disclosure provide improvements in the field of video technology, including live video production. To generate video content that combines navigation through 3D graphics driven by the content creator's gestures, existing techniques required a 3D production pipeline to produce a 3D image from a 3D environment composited with the content creator using specialized video editing software. These techniques, however, are limited to post-production and cannot be applied to live video streams. Existing technologies with the capability to interactively navigate a 3D space during live video stream production require considerable technical skill to implement. Some embodiments of the present disclosure may allow content creators to combine the performance and post-processing steps using context-aware interactions. The interactions can cause content to be animated and displayed according to the user's performance in substantially real-time. Thus, content creators can quickly and easily navigate complex 3D layered images of a live video stream by taking simple, intuitive actions. As described above, the methods can be applied during live video streams, removing the requirement for complex post-processing.

I. OVERVIEW

Figure 1B:
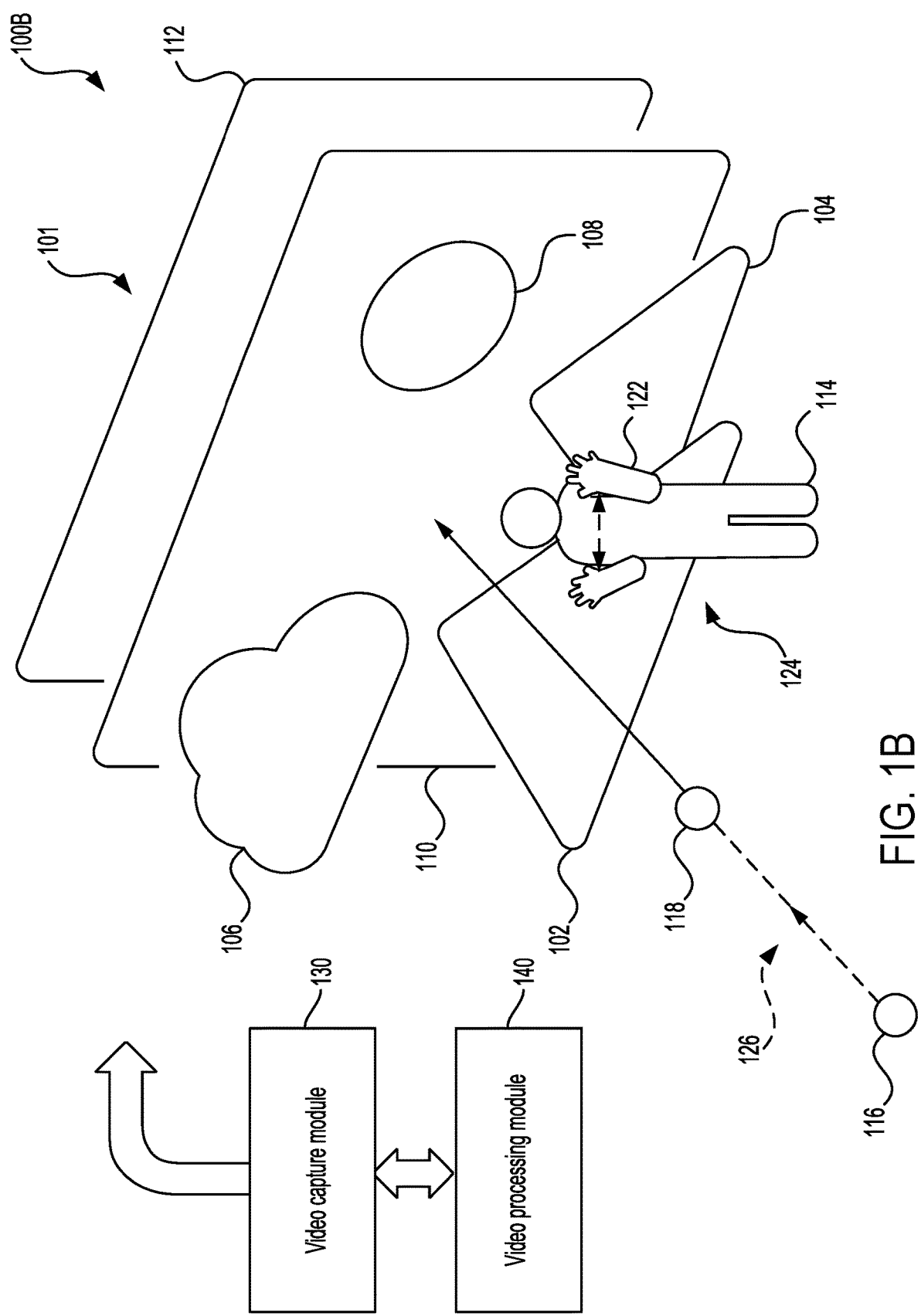

FIGS. 1A-B show illustrations of example environments 100A-100B employing body-driven interactions in three-dimension layered images. In FIG. 1A, the environment 100A includes video capture module 130 and video processing module 140, which may reside in a computing system 900 of FIG. 9, that is configured to identify actions and implement corresponding transform operations.

Video capture module 130 may include components for capturing and displaying video. For instance, the video capture module 130 may include, among other components, a camera, a display device, and one or more devices for detecting the gestures of subject 114. The video processing module 140 can include components for identifying actions of the subject, determining an appropriate transform operation, transforming the 3D layered image, and rendering the 3D layered image onto the video stream captured and displayed by the video capture module 130. In FIG. 1A, the video stream, which may include the subject 114 and the rendering of 3D layered image 101, is sent to the video processing module 140 for identification of actions, determination of transforms, application of transforms to the viewpoint 116, and re-rendering of the 3D layered image 101. In FIG. 1B, the video capture module 130 displays the re-rendered 3D image on the display device.

FIG. 1A depicts a 3D layered image 101 made of up several 2D planar images arranged in a 3D space. The objects from FIG. 1A are shown in a layered ordering that reflects their apparent distance from the viewpoint 116. Mountain 102 is first, followed by cloud 106, mountain 104, sun 108, and then sky background 110. Layered after sky background 110 is distant background 112. Some examples may include more or less 2D layers. 2D layers need not be parallel as shown in FIG. 1A for clarity.

Viewpoint 116 is shown to illustrate two possible transformable viewpoint properties. Viewpoint 116 includes an arrow indicating its direction and a black circle indicating its location. Viewpoint 116 also has a zoom level (not shown). In some implementations, viewpoint 116 may have other properties that can be transformed. For instance, the viewpoint can be configured to have transformable properties including, for example, orientation (corresponding to a rotation transformation), reflection, visual filters, and audio filters, among other possibilities. The viewpoint 116 is the perspective from which the 3D layered image 101 will be rendered for presentation in the video stream. Viewpoint 116 is also the object of the transform operations. To create the appearance of translation, scaling, or rotation in the 3D layered image 101 represented as layers of 2D images, one or more properties of the viewpoint 116 may be changed and the scene can be re-rendered.

Subject 114 is shown superimposed on 3D layered image 101. Subject 114 is shown in front of mountain 102, which may be rendered as such by the video processing module. However, using the techniques of the present disclosure, the subject 114 may also be rendered in between 2D layers, creating the appearance of the subject 114 being embedded among the 2D layers or further away from viewpoint 116.

The camera associated with the video capture module 130 may be used to capture the subject 114 in front of a background suitable for embedding. For example, the camera may capture the subject 114 in front of a green screen, or similar chroma key background. A 3D layered image 101 can be keyed onto the green screen, creating the appearance, in the video stream, of the subject 114 in front of the 3D layered image 101. The 3D layered image 101 may be rendered on a display device provided by the video capture module 130.

The camera and motion tracking components associated with the video capture module 130 may be used to capture gestures made by subject 114. The gesture information determined from the motion tracking components of the video capture module 130 may be sent to the video processing module 140. The video processing module 140 may identify one or more actions from the gestures of the subject 114. The video processing module 140 may include components for identifying an action from the gesture information. From the action, the video processing module 140 can determine a corresponding transform operation and apply the transform operation to the viewpoint 116.

In FIG. 1A, subject 114 is shown in the initial position 120 of an action. In some examples, the beginning of an action is demarcated using a trigger. For example, the subject 114 can use a remote control, clicker, or voice command to indicate the beginning of an action. In some examples, the video processing module 140 can identify an action without a trigger. In some other examples, a trigger can be used to demarcate the end of an action in addition to or rather than the beginning of an action.

In FIG. 1B, subject 114 has performed a gesture resulting in the final position 122. The gesture(s) made by subject 114 beginning with initial position 120 and resulting in final position 122 make up an action. For example, for a "pinch to zoom" action, initial position 120 may be the initial spacing of the two hands of subject 114. The final position 122 may be the final spacing of the two hands of subject 114. In FIG. 1B, the "pinch to zoom" action is depicted at 124. The video processing module 140 can identify the pinch to zoom action and the corresponding transform which may be a change in the location of viewpoint 116. The video processing module 140 may then apply the transform operation to the viewpoint 116 through the application 3D transformations on the viewpoint or another suitable technique.

Following identification of the transform operation, viewpoint 116 is translated to viewpoint 118 by video processing module 140. In this example environment 100B, the transform is a linear translation from one point in 3D space to a point closer to the subject 114 in 3D space. Viewpoint 116 is thus moved forward in the 3D space to create the appearance of moving forward or zooming in in the 3D space. In FIG. 1B, the change in viewpoint position is depicted at 126. As the viewpoint 116 moves forward, the 2D layers may also appear to move forward as rendered in the video stream. In some examples, a similar effect may be accomplished by adjusting the zoom level of viewpoint 116 in concert with or instead of changing the location.

Following application of the transform operation, 3D layered image 101 is re-rendered from the perspective of transformed viewpoint 118 by the video processing module. For example, the video processing module 140 may perform the re-rendering using one or more processing devices including, for instance, a one or more graphics processing units ("GPU"). The re-rendered 3D layered image 101 is then displayed on the display device provided by the video capture module 130.

II. THREE-DIMENSIONAL LAYERED IMAGES

Figure 2:
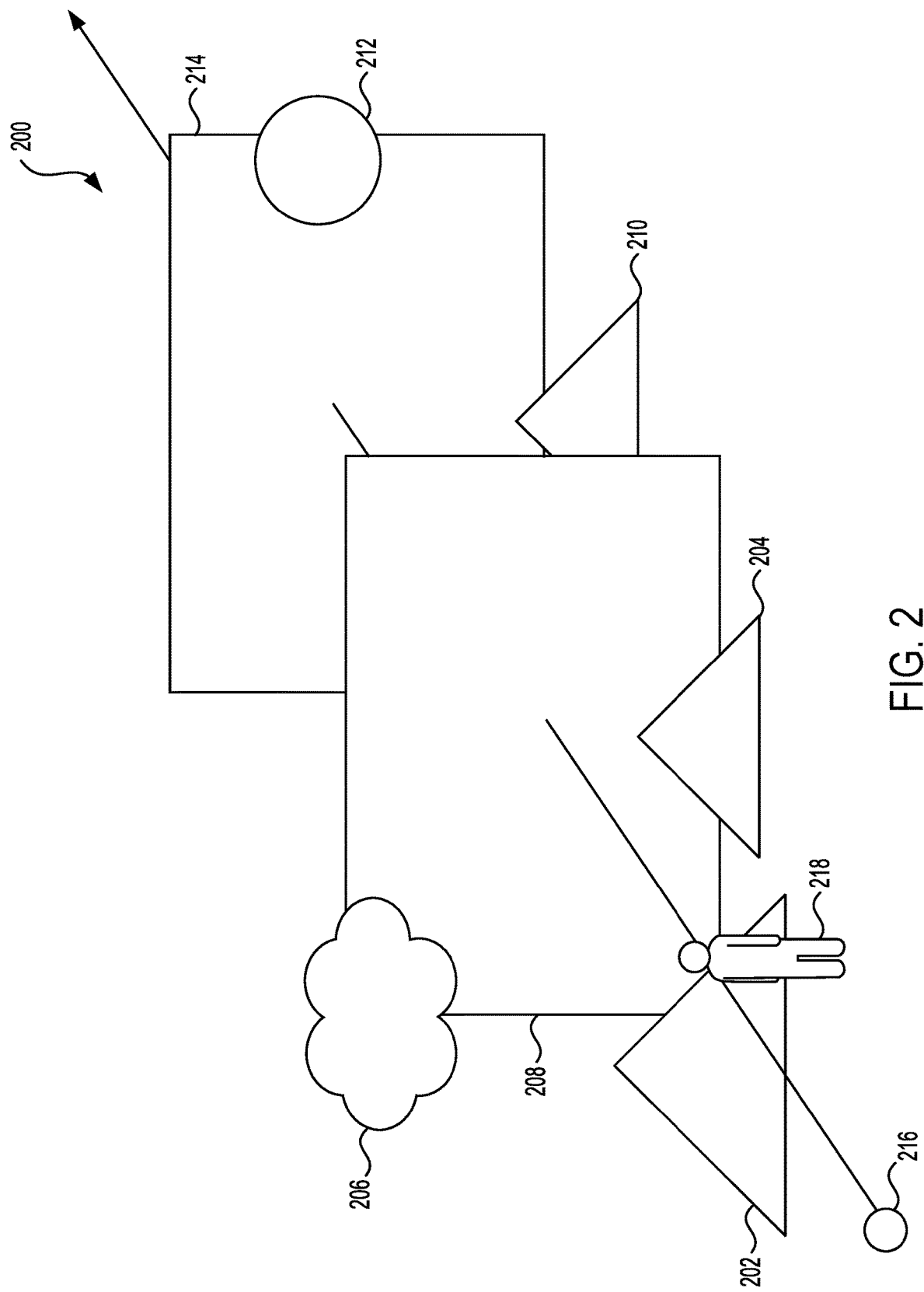
FIG. 2 shows an illustration of an example 3D layered image.

FIG. 2 shows an illustration of an example 3D layered image 200. A 3D layered image may be a projection of a 3D environment on a 2D plane in which the 3D environment is made of up layered 2D planar images. The 3D environment may exist in a 3D space. In the example image 200, the 3D environment is an outdoor scene including mountains, clouds, and the sun. Example 3D layered image 200 is depicted in FIG. 2 as a perspective view of the layered 2D planar objects making up the 3D layered image 200.

For example, as seen in FIG. 2, the various objects making up the 3D environment are represented as 2D planar images. The 2D images include mountains 202, 204, 210, cloud 206, sun 212, sky background 208, and distant background 214. The 2D images can be layered in an order that corresponds to their depth in the 3D environment with respect to a particular viewpoint 216. From a viewpoint 216 in 3D space oriented in a direction towards the 3D environment, closer objects may be layered before more distant objects. Thus, if mountain 202 is closer than sun 212 from the perspective of the particular viewpoint 216, it will be layered before the sun 212.

Viewpoint 216 is shown with an arrow indicating its direction and the black circle indicating its location. Viewpoint 216 may also have a zoom level or properties (not shown). The viewpoint 216 is the perspective from which the 3D layered image 200 will be rendered for presentation in the video stream. It is also the object of the transform operation that are caused by the actions of the subject during live video presentations. To create the appearance of translation, scaling, or rotation of the 3D environment represented as layers of 2D images, one or more properties of the viewpoint 216 is changed. For example, moving the viewpoint 216 forward in the 3D space can create the appearance of moving forward in the 3D space as the 3D layered image is rendered. In addition, as the viewpoint 216 moves forward, the 2D layers may also appear to move backward as rendered in the video stream, creating the impression of forward translation in the 3D space.

Also shown in FIG. 2 is subject 218 superimposed on 3D layered image 200. Subject 218 is shown in front of mountain 202. When the 3D layered image is rendered by the video processing module, subject 218 may be shown in front of mountain 202. In some embodiments, the subject 218 may be rendered in between 2D layers, creating the appearance of the subject 218 being embedded among the 2D layers or further away from viewpoint 216.

The example 3D layered image 200 may be composed using software modules for creation of 3D layered images. For example, one software module may provide graphic artists with the capability to create 3D layered images using a client device and an attached stylus or other input device. Another example software module may allow for the conversion of 3D modeled or rendered graphics into to 3D layered images. As mentioned above, the 3D layered image 200 has an associated viewpoint 216. For example, the viewpoint 216 may correspond to a virtual camera in the 3D space configured to display the 3D layered image 200 in the video stream or in the software modules for creation of 3D layered images. The properties of viewpoint 216, like location, direction, and zoom level may map to the location, direction, and zoom level of the virtual camera. The viewpoint may represent the perspective from which the 3D layered image will be generated and/or rendered.

3D layered images are effective for navigation using body-driven interactions because they are more easily created in contrast to a complete 3D rendering and have properties that are amenable to the lower-fidelity control signals that are possible with the capture of gestures. For instance, a discrete location transformation from one layer to another can be indicated with a gesture, regardless of how large the transformation is in absolute terms. However, one skilled in the art will appreciate that the techniques of the present disclosure may be used to drive movement in and around arbitrary 3D environments using body-driven interactions. However, use of the innovations of this disclosure with arbitrary 3D environments may require additional calibration to match the visual parameters of the subject to the 3D environments. For example, calibration may be needed to determine the size of the subject's body and orientation of gestures relative to the virtual camera to accurately depict the subject in or among an arbitrary 3D environment.

III. COMPUTING ENVIRONMENT

Figure 3:
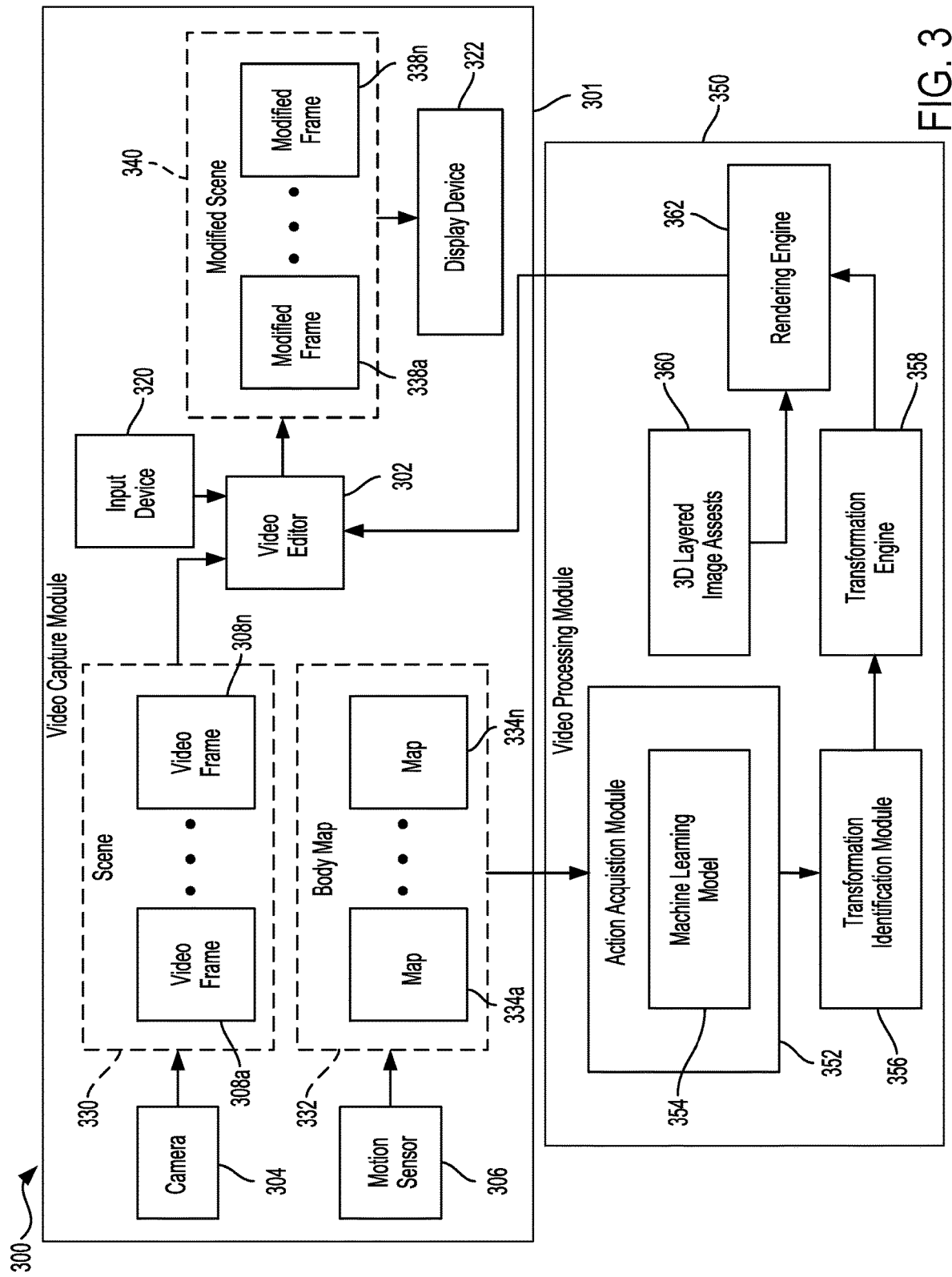
FIG. 3 depicts an example of an environment for performing body-driven interactions in 3D layered images

FIG. 3 depicts an example of an environment 300 for performing body-driven interactions in 3D layered images. Video processing for body-driven interactions in 3D layered images can involve adding graphics to a video that interact with a user's motion. The video processing environment 300 includes a set of communicatively coupled components. These components include a video capture module 301 and a video processing module 350.

The video capture module 301 may be a software module or computer program product including program code that includes components for capturing video, editing video, and display of a video stream on a display device. The video processing module 350 may be a software module or computer program product including program code that includes components for storage and rendering of 3D layered images, application of a machine learning model to the video stream to identify actions, determination of transformations using those actions, and application of the determined transformations to the viewpoints used to render 3D layered images.

The video capture module 301 may be a component of a computing device implemented in software, hardware, or a combination of both. The video capture module may include program code for generating, sending, and receiving video streams. For example, the video capture module 301 may include a commercially available software program like Adobe Premiere Pro that can be used for controlling, capturing, and digitizing video streams. The video capture module 301 may also include one or more cameras 304 for capturing video streams.

The camera 304 is configured to acquire a set of video frames 308a-n of a scene 330. The motion sensor 306 is a motion-sensing device configured to generate a body map 332 of a subject in the scene 330. For example, the motion sensor 306 may be a Microsoft Kinect® that can sense body movement of a subject in the scene 330 and create a body map 332. ("Kinect®" is a trademark owned by Microsoft Corporation). However, the motion sensor can be any device suitable for motion capture and creation of maps. For instance, some embodiments can use a webcam or other camera for motion sensor 306 coupled with computer vision. In some examples, camera 304 and motion sensor 306 may be the same device.

In some embodiments, the motion sensor comprises a red, green, blue (RGB) color video camera, a depth sensor, and/or a multi-array microphone. The RGB color video camera can be used as the camera 304. The body map 332 is a representation of body position of the subject. For example, the body map 332 contains a set of points in 2D or 3D space at which body parts (e.g., head, joint, etc.) of the person are positioned. For instance, a set of maps 334a-n of the body map 332 is generated, wherein each of the maps 334a-n is a map representing body position of the person at a given time, and the set of maps 334a-n represent position of the person over time. The set of video frames 308a-n are fed to the video editor 302, while the set of maps 334a-n are sent to the action acquisition module 352.

The input device 320 can include one or more components for importing data, such as a keyboard, a mouse, a stylus, etc. In some embodiments, the input device 320 can include a clicker (e.g., a wearable clicker) for the user to have interactive control during a presentation (e.g., to advance between graphics; trigger a graphic; for a graphic to appear, disappear, fade, etc.). The input device 320 can also be used for identifying body-driven interactions. In some embodiments, the input device 320 may include a microphone, mouse, clicker, joystick, or remote control, among other possible device, which can be used as triggers to identify the beginning and/or end of actions.

The video editor 302 includes program code for displaying and editing video content. For instance, the video editor 302 can include program code for rendering content for display, overlaying graphical elements on a video, and/or program code for modifying graphical elements in real time in response to body movement of a user. The video editor 302 may further comprise components for gesture recognition, asset storage, and effects libraries, among others. In addition, the video editor 302 may overlay a rendered 3D layered image onto the scene 330 including the subject captured in front of a green screen or other chroma key background. The video editor 302 receives rendered 3D layered images from the rendering engine 362, as will be discussed in more detail below.

The video editor 302 generates a set of modified frames 338a-n to form a modified scene 340. For instance, the video editor 302 may combine the output of 3D rendered layered images from the rendering engine 362 with frames 308a-n to produce modified frames 338a-n. The display device 322 is used to present the modified scene 340. In some embodiments, the modified scene 340 is presented on the display device 322 in real-time (e.g., presenting a modified scene 340 on the display device 322 no more than 0.5 seconds, 3 second, 2 seconds, or 5 seconds after the camera 304 acquires a video frame 308 of the scene 330) for live video productions. In some embodiments, the display reverses a modified scene, as a mirror, for a presenter to watch as the presenter interacts with graphical elements. In some embodiments, the display device 322 can be wearable mixed-reality eyeglasses or a headset and have a viewpoint of the presenter. The wearable mixed-reality eyeglasses or headset can be used to reduce mental overload of the presenter interacting with graphical elements. Sensors on the wearable mixed-reality eyeglasses or headset could also be used to improve accuracy of overlaying graphical elements.

The video processing module 350 may be a component of a computing device implemented in software, hardware, or a combination of both. The video processing module 350 may include program code for generating, sending, and receiving video streams. For example, the video processing module may include a commercially available software program like Adobe After Effects or Spark Video that can be used for creating visual effects, motion graphics, and other video processing functions.

The video processing module 350 includes action acquisition module 352. Action acquisition module 352 receives the set of maps 334a-n making up the body map 332 acquired by motion sensor 306 during video capture for a live video production. The action acquisition module 352 can identify actions from the maps 334a-n. In certain embodiments, action acquisition module 352 can identify actions from video frames 308a-n, without the need for motion sensor 306.

In some embodiments, actions may be composed of one or more gestures. The action acquisition module 352 may identify gestures from the maps 334a-n using by comparing them with a set of predetermined gestures. The predetermined gestures can be static or dynamic. A static gesture is a stationary position. Static gestures include, for example, pointing and body posture. A dynamic gesture changes body position in a specified way over time. Dynamic gestures include, for example, pantomimic gestures and direct manipulation. A static gesture can be identified by one map 334 of the set of maps 334a-n or a plurality of the set of maps 334a-n by the body map 332 not changing position in the plurality of the set of maps 334a-n for a given duration (e.g., 0.5, 3, 2, or 5 seconds). A dynamic gesture can be identified by tracking changes of the body map 332 in multiple maps 334 of the set of maps a-n. The action acquisition module 352 includes program code that, when executed by processing hardware, performs one or more operations for identifying gestures performed by a person in the scene 330. The action acquisition module 352 may further contain program code for identifying actions from one or more gestures. In certain embodiments, action acquisition module 352 can identify static and dynamic gestures from video frames 308a-n, without the need for motion sensor 306.

In certain embodiments, making the gestures comprising an action may cause cognitive overhead for the subject of a live video production trying to cause specific pre-programmed camera movements. In particular, the action acquisition module 352 may need to discriminate between deliberate actions intended to cause a viewpoint movement and improvisation. The action acquisition module 352 must therefore have robust tracking capabilities. Particularly, because improvisation involves many incidental gestures that could collide with gestures intended for control, the robust tracking features of the action acquisition module 352 must be able to balance these concerns.

Action acquisition module 352 may include a machine learning model 354 in some embodiments. The machine learning model 354 can be trained to identify actions from the information received from the video capture module 301. In some examples, the machine learning model 354 may include an adaptive naive Bayes Classifier, but other machine learning algorithms are possible. For example, the machine learning model 354 may include one or more algorithms used for regression, classification, clustering, or reinforcement learning. Example algorithms may include reinforcement learning models, K-means clustering algorithms, support vector machines, linear regression models, logistic regression models, artificial neural networks, decision trees, random forests, nearest neighbor algorithms, or others. The machine learning model 354 can be trained using supervised, semi-supervised, unsupervised training.

As a certain action is detected, the action acquisition module 352 can send an indication that the gesture has been performed to the transformation identification module 356. The transformation identification module 356 may include a mapping of actions to viewpoint transform operations. The transformation identification module 356 can determine the transform operation corresponding to the action identified by the action acquisition module 352. For instance, a "pinch to zoom" action may be mapped to either or both of a viewpoint location change or zoom level change. In some examples, the mapping may include additional information including particular types of triggers. For instance, in some cases a voice command can be used as a trigger before a pinch to zoom action. A first voice command can be used to precede a pinch to zoom action that causes a viewpoint location change, whereas a second voice commands can be used to precede a pinch to zoom action that causes a viewpoint zoom level change.

The transformation identification module 356 can identify characteristics of actions from the gestures making up those actions. For example, for a pinch to zoom action, the transformation identification module 356 may identify both the distance between the initial and final hand positions at the beginning and end of the action. In some cases, the magnitude of the distance between the initial and final hand positions may correspond to the magnitude of the corresponding transform operation. In other cases, however, the magnitude of the corresponding transform operation may be fixed.

Once a transform operation is determined from the mapping, transformation identification module 356 may send an indication of the determined transform operation to transformation engine 358. Transformation engine 358 receives information about the determined transform operation and applies the transform operation to the viewpoint. The transformation engine 358 may apply one or more mathematical operations to the initial properties of the viewpoint in accordance with the determined transform to determine the final properties of the viewpoint. For example, following a pinch to zoom action that is mapped to a change in location of the viewpoint, the transformation engine 358 may apply a linear translation to the 3D space coordinates of the viewpoint. The linear translation may be performed using vector addition, matrix multiplication, or other suitable mathematical technique. Other transform operations that may be performed on the viewpoint include zooming, scaling, rotation, inversion, reflection, rotation, shearing, among other possibilities. Each transform operation may have one or more suitable associated mathematical operations.

In some examples, the transformation engine 358 may determine a series of steps along the transform operation to affect a smooth animation. For example, if the transform operation is a 3D translation from an initial location to a final location, the transformation engine 358 may determine one or more intermediate steps in between the initial and final location. The intermediate steps may correspond to video frames 308*a-n*. The location steps can be sent to the rendering engine 362 individually or as a batch for rendering onto a series of video frames to cause the rendering of a smooth 3D animation.

Given the transformed configuration of the viewpoint, the transformation engine 358 sends an indication of the transformed viewpoint to rendering engine 362. Rendering engine 362 also receives 3D layered image assets 360 from, for example, a communicatively coupled memory device. The memory device may be local or remote storage and is shown for illustrative purposes as a component of video processing module 350. However, in some embodiments, the assets may be stored, for example, in remote cloud storage or other suitable location.

Rendering engine 362 may generate a transformed 3D layered image using the 3D layered image assets 360 and the final, transformed configuration of the viewpoint. The transformed 3D layered image may be rendered onto one or more of video frames 308*a-n*, which may include chrome keyed backgrounds to overlay the transformed 3D layered image onto. The rendering engine 362 may perform the re-rendering using one or more processing devices including, for instance, a one or more graphics processing units ("GPU"). In some examples, the rendering engine 362 can generate the transformed 3D layered image and send the rendering to the video editor 302 for overlay onto video frames 308*a-n*.

In some embodiments, the action and/or transform operation may be identified or determined on frame-by-frame basis in order to provide for the appearance of an animated transformation occurring during the action. Video frames 308*a-n* may correspond to iterative steps to be taken during a smooth animation. The steps may correspond to times steps. For example, a trigger may be used to identify the beginning of a pinch to zoom action by action acquisition module 352. The transformation identification module 356 may determine that the pinch to zoom action corresponds to change in the location of the viewpoint. Viewpoint initial location may correspond to the perspective from which video frame 308*a* was rendered. The transformation engine 358 may then begin to apply one or more mathematical operations to the initial properties of the viewpoint in accordance with the determined transform to determine the viewpoint properties in the next frame, video frame 308*b*. The rendering engine 362 receives an indication of the transformed viewpoint as well as 3D layered image assets 360. Rendering engine 362 may generate a transformed 3D layered image using the 3D layered image assets 360 and the iterative, transformed configuration of the viewpoint in the next frame, video frame 308*b*. The determination of the next step in the action, the corresponding transform operation, transformation of the viewpoint, and re-rendering can be performed for each frame during the identified action to create the impression of a smooth animation during the performance of the action.

IV. EXAMPLE ACTIONS AND TRANSFORM OPERATIONS

The video processing module 350 includes the action acquisition module 352 that can be configured to recognize various actions. In some embodiments, action acquisition module 352 includes machine learning model 354 that can be trained to recognize one or more actions. FIGS. 4-7 and the accompanying description show several example actions in detail. The example actions include components that can be recognized by transformation identification module 356 for computation of transform operation.

In certain embodiments, actions may be preceded and/or concluded using a trigger. The trigger can be a remote control, clicker, joystick, voice command, microphone, action by another subject or system, or any other suitable trigger mechanism or technique for demarcating the beginning or end of an action. In cases with only a starting trigger, the action acquisition module 352 may wait a specified period of time following the trigger for an action to conclude. In some other embodiments, the completion of the action may be indicated with a second trigger. The first trigger and the second trigger may use different mechanisms. For instance, the beginning of an action can be indicated using a remote control and the end of the same action can be indicated using a voice command.

Upon determination that the action is complete, the action acquisition module 352 may send the identified action to transformation identification module 356. Transformation identification module 356 may determine, from a mapping of actions to transform operations, the transform operation corresponding to the action as well as characteristics of the action needed for calculation of the transform operation to be applied to the viewpoint. Transform operations may include changing the viewpoint location, direction, or zoom level. Other transformations of the viewpoint may also be possible including, for example, reflection or rotation of the viewpoint. The transformation identification module 356 may then determine the magnitude of the transform operation. For example, the magnitude of the transform operation may correspond to a change location, direction, and/or zoom level in the 3D space. The magnitude may be expressed in units suitable for use in program code. For instance, the zoom level may be expressed as a multiplicative factor. Likewise, the change in distance in the 3D space may be expressed using a measure relative to distances in the 3D space. In some embodiments, the magnitude of the transform operation is fixed. In that case, the identification of an action then causes a transform operation, but the magnitude of the operation is the same, regardless of the values of the action characteristics measured in the action. In other embodiments, the values of the action characteristics may determine the magnitude of the transform operation.

A. Hand Distance for Viewpoint Location or Zoom Level ("Pinch to Zoom")

FIGS. 4A-D show illustrations of an action 400 used in some example systems for body-driven interactions in three-dimension layered images, according to some aspects of the present disclosure. The action 400 can relate a change in the distance between the subject's hands to transform operation 402, which may be a change in the location or zoom level of the viewpoint. Following an optional trigger, the subject can use a hand gesture to cause a viewpoint location movement or a zoom level change proportional to the difference in distance between the hands at the beginning and end of the motion. The hand gesture may be similar to a "pinch to zoom" movement familiar from smartphones, tablets, etc. For instance, moving the hands farther apart may correspond to zooming in, while moving the hands closer together may correspond to zooming out.

Figure 4A:
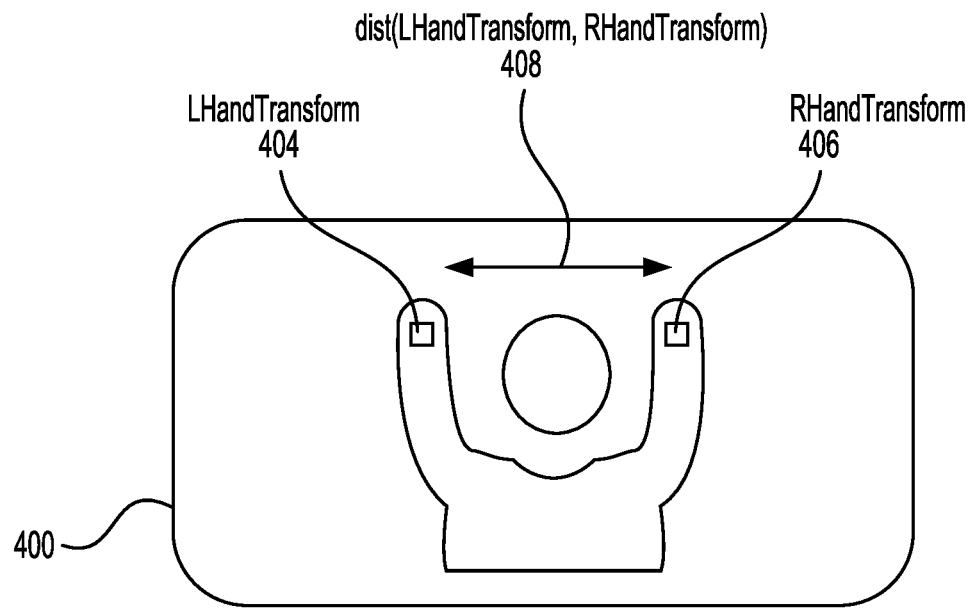
FIGS. 4A-D show illustrations of an action used in some example systems for body-driven interactions in 3D layered images, according to some aspects of the present disclosure.
Figure 4B:
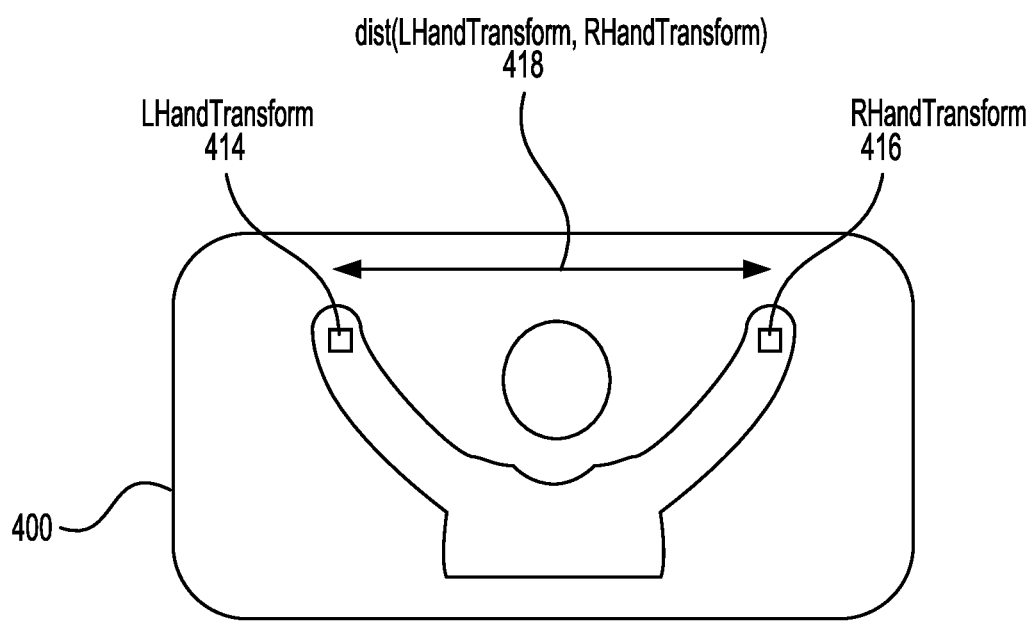

As shown in FIG. 4A, identification of action 400 may include identification of initial left hand position 404 and initial right hand position 406. Action acquisition module 352 may be configured to measure the change in hand position following the trigger. Therefore, after identification of initial left position 404 and right hand position 406, identification of action 400 may include identification of final left hand position 414 and final right hand position 416, as shown in FIG. 4B. In some examples, left hand position 404, 414 and right hand position 406, 416 may be represented in program code or pseudocode as LHandTransform and RHandTransform, respectively.

Transformation identification module 356 can use initial/final left hand position 404, 414 and initial/final right hand position 406, 416 to determine a distance 408, 418. Initial left hand position 404 and initial right hand position 406 can be used to determine an initial distance 408, which can be represented in program code or pseudocode as startDist. Likewise, final left hand position 414 and final right hand position 416 can be used to determine a final distance 418, which can be represented in program code or pseudocode as endDist.

Comparison of the initial distance 408 with the final distance 418 may be performed by transformation identification module 356. For example, initial distance 408 and final distance 418 can be divided by one another, subtracted from one another, or compared using any other suitable operation suitable for determination of the magnitude of the transform operation. In some examples, the final distance 418 is divided by the initial distance 408. If the final distance 418 is greater than the initial distance 408, the quotient will be greater than 1, indicating a desire by the subject to zoom in. Likewise, if the final distance 418 is less than the initial distance 408, the quotient will be less than 1, indicating a desire by the subject to zoom out. The value of the ratio given by the final distance 418 divided by the initial distance 408 can be multiplied by a base scaling factor to determine the magnitude of the transform operation 402. In some examples, the magnitude of the transform operation can be fixed and the transformation identification module 356 only determines the direction (zooming in or zooming out) of the transform operation.

Figures 4C, 4D:
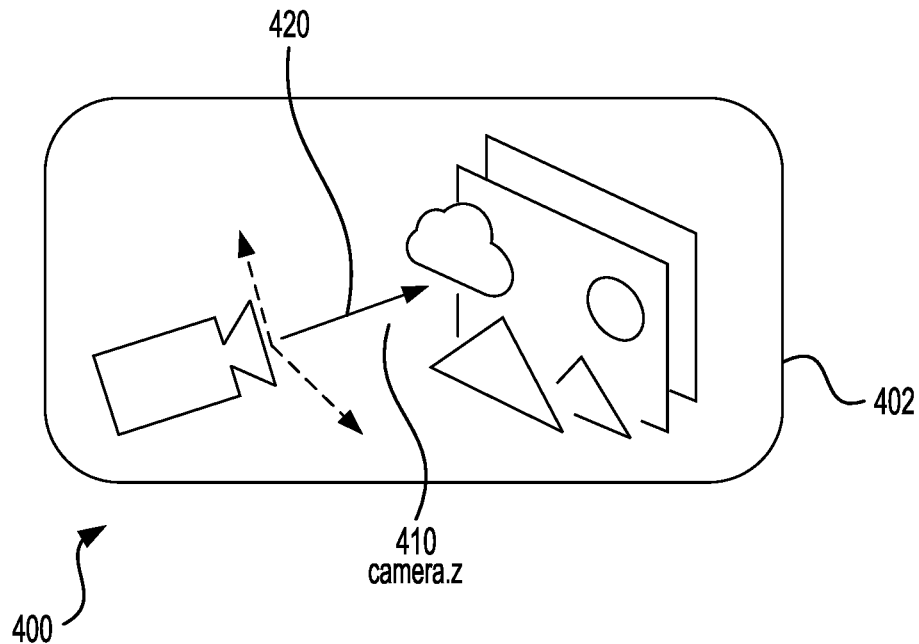

In FIG. 4D, example pseudocode 422 is depicted that portrays one example implementation of transform operation 402 that may be performed by transformation identification module 356. Pseudocode 422 includes two functional groupings. In the first functional grouping 424, labeled OnDollyTrigger, the initial distance 408 is determined. In the second functional grouping 426, labeled OnAnimate, the final distance 418 is determined. The quotient obtained by dividing the final distance 418 by the initial distance 408 obtained to determine whether the subject has indicated a zoom in or a zoom out operation. Finally, the translation is applied by changing the location of the viewpoint 420, represented by the variable camera.z 410, with an additive zoom factor, as illustrated in FIG. 4C. In some embodiments, as discussed above, the zoom factor may be a fixed value or it may be a computed value. Other transform operations are possible. For example, the zoom factor may be a multiplicative factor. In some embodiments, the zoom level of the viewpoint is adjusted rather than or in addition to the viewpoint 420 location.

B. Body Position for Viewpoint Location or Direction

FIGS. 5A-D show illustrations of an action 500 used in some example systems for body-driven interactions in three-dimension layered images, according to some aspects of the present disclosure. The action 500 can relate a change in the lateral position of some point on the subject's body to transform operation 522, which may be a change in the location or direction of the viewpoint 520. Following an optional trigger, the magnitude of the subject's displacement can be used to cause a viewpoint location movement proportional in size to the magnitude of the displacement. For example, the action 500 may include a lateral change in distance of a point on the subject's head bracketed by a start trigger and a stop trigger. The magnitude and direction of the displacement of the point may cause a displacement of the location or direction of the viewpoint of magnitude proportional to the magnitude of the displacement of the point. In some embodiments, the direction of the subject's displacement can be used to cause a viewpoint direction change that results in the changed direction of the viewpoint corresponding to the final location of the subject's displacement.

Figure 5A:
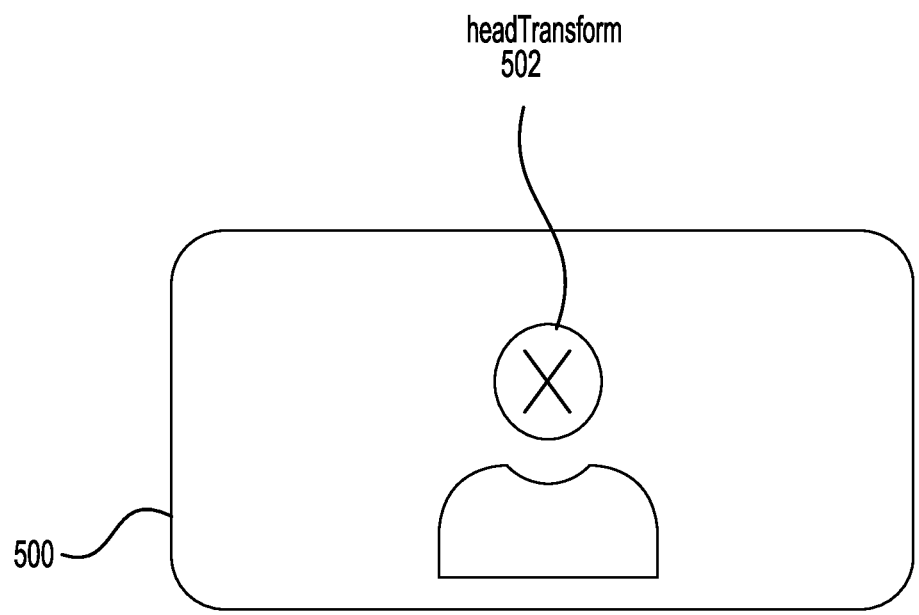
FIGS. 5A-D show illustrations of an action used in some example systems for body-driven interactions in 3D layered images, according to some aspects of the present disclosure.

Example action 500 can be identified using lateral motion of any trackable location on the subject's body. For illustrative purposes, motion of the subject's head will be discussed in the following examples. As shown in FIG. 5A, identification of action 500 may include identification of initial head position 502. Head position may be identified, for example, using a particular point on the subject's head by motion sensor 306. The action acquisition module 352 may be configured to track a particular point identified among maps 334a-n or video frames 308a-n. For example, the action acquisition module 352 may be configured to identify a region, like the head, and to choose a point within that region, like an eye. Other approaches to identification of the point for displacement tracking may be used. Identification of the point may be performed by trained machine learning model 354 in certain embodiments.

Figure 5B:
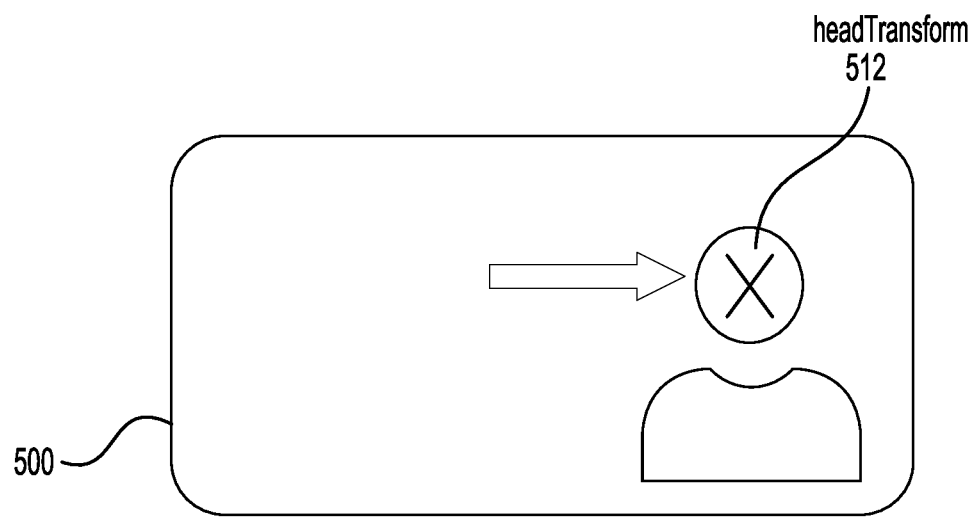

Action acquisition module 352 may be configured to measure the change in position of the point following the trigger. Following identification of initial head position 502, identification of action 400 may include identification of final head position 512, as shown in FIG. 5B. In some examples, head position 502, 512 may be represented in program code or pseudocode as headTransform. Head positions 502, 512 may be represented in a memory device using a suitable representation. For example, head positions 502, 512 may be stored as coordinates in the 3D space, using the relative direction and distance from the viewpoint, or other possible machine-readable representations.

Transformation identification module 356 can use initial/final head position 502, 512 to determine a direction 524 for viewpoint 520. The direction 524 may be represented in program code or pseudocode as camera.lookAt 524. The transformation identification module 356 may use the initial head position 501 and the final head position 512 to determine the direction 524. In one example representation, if head positions 502, 512 are represented as vectors, direction 524 can be determined by the subtracting the vector representing the final head position 512 from the vector representing the initial head position 502. Any other suitable operation suitable for determination of the transform operation may be used. Once the direction 524 is determined from head positions 502, 512, the transformation can be applied to viewpoint 520 by transformation engine 358.

Figures 5C, 5D:
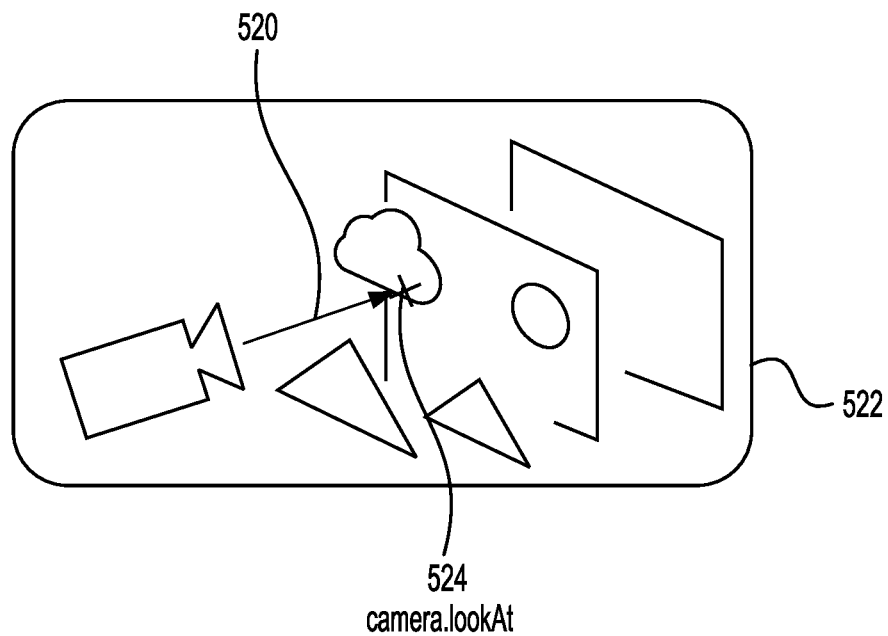

FIG. 5D, example pseudocode 530 is depicted that portrays one example implementation of transform operation 522 that may be performed by transformation identification module 356. Pseudocode 530 includes two functional groupings. In the first functional grouping 532, labeled OnTrigger, the trigger status is determined. For example, if the trigger indicating the start of the action 500 has been indicated, the Boolean variable FollowFace may be set to true. In the second functional grouping 534, labeled OnAnimate, based on the state of the trigger, the viewpoint direction is updated to reflect the direction 524 determined by the transformation identification module 356. In some embodiments, the head positions 502, 512 may be used to determine a new viewpoint location instead of or in addition to direction. Other body parts or a combination of body parts of the subject may be used in action 500. For example, one eye may be used to determine the initial position and the second eye may be used to determine final position.

C. Depth Change for Viewpoint Location, Direction, or Zoom Level

FIGS. 6A-D show illustrations of an action 600 used in some example systems for body-driven interactions in three-dimension layered images, according to some aspects of the present disclosure. The action 600 can relate a change in the relative distance of between two or more pairs of points on the subject's body to transform operation 602, which may be a change in the location, direction, or zoom level of the viewpoint 630. The change in the relative distance of between two or more pairs of points may be a means for estimating a change in depth. Following an optional trigger, the magnitude of the change in relative distances on the subject's body can be used to cause a viewpoint location movement or zoom level change proportional in size to the magnitude of the change in relative distance. For example, the action 600 may include changes in relative distance of two or more pairs of points on the subject's head bracketed by a start trigger and a stop trigger. The magnitude of the change in relative distance of the points may cause a change in the location or zoom level of the viewpoint of magnitude proportional to the magnitude of the change in relative distance of the points. Some embodiments may include a minimum threshold for the magnitude of the change in relative distance before the transform operation will be computed or applied to the viewpoint.

Figure 6A:
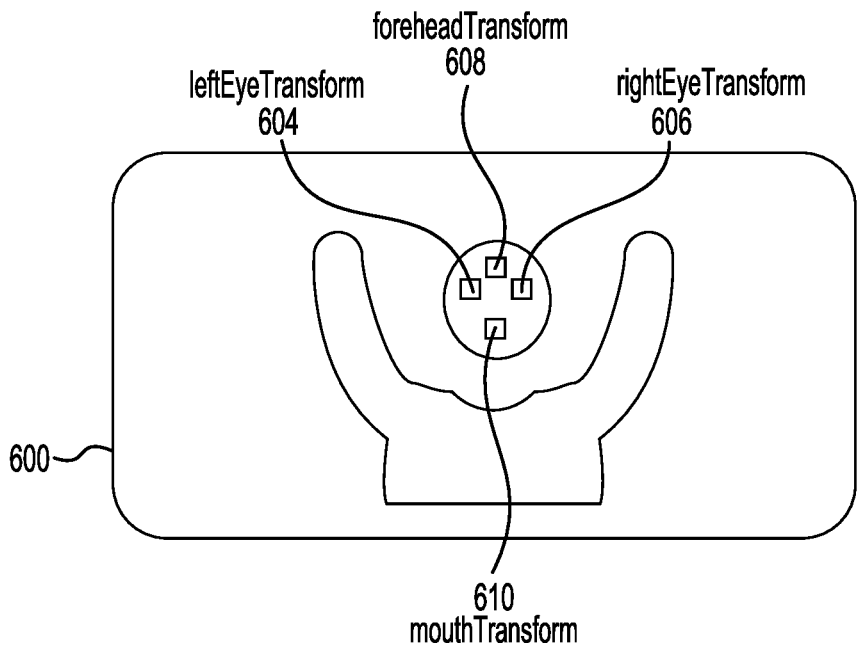

As shown in FIG. 6A, identification of action 600 may include identification of two or more initial pairs of points 604, 606, 608, 610 on the subject's body. The action acquisition module 352 may be configured to track particular points. For example, the action acquisition module 352 may be configured to identify a region, e.g., the head, and to choose points within that region, e.g., eyes, forehead, chin, etc. Identification of points may use machine learning model 354. Other approaches to identification of the point for displacement tracking may be used. Action acquisition module 352 may be configured to measure the change in relative position of pairs of points following the trigger.

Figure 6B:
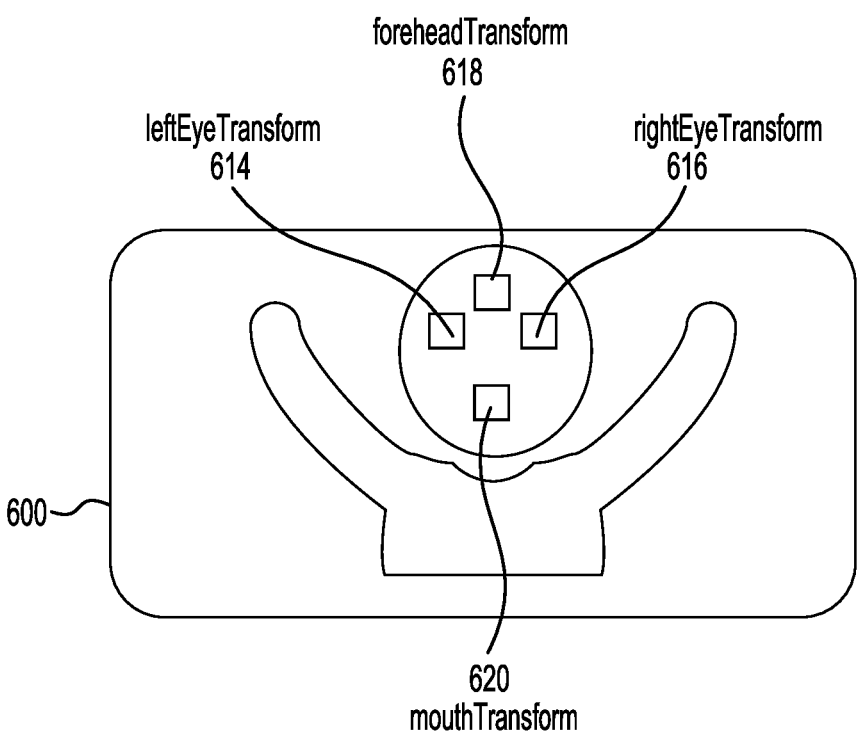

In an illustrative example, FIGS. 6A-B show an example action 600 in which the action acquisition module 352 has selected a first pair of points including the left and right eyes and a second pair of points including the forehead and the mouth. Action acquisition module 352 identifies initial left eye position 604 and initial right eye position 606. Action acquisition module 352 also identifies initial forehead position 608 and initial mouth position 610. Following identification of initial positions, identification of action 600 may include identification of final left eye position 614 and final right eye position 616 and final forehead position 618 and final mouth position 620, as shown in FIG. 6B. In some examples, left eye positions 604, 614 may be represented in program code or pseudocode as leftEyeTransform; right eye positions 606, 616 may be represented in program code or pseudocode as rightEyeTransform; forehead positions 608, 618 may be represented in program code or pseudocode as foreheadTransform; and mouth positions 610, 620 may be represented in program code or pseudocode as mouthTransform. Positions may be represented in a memory device using a suitable representation. For example, right eye positions 606, 616 may stored as coordinates in the 3D space, using the relative direction and distance from the viewpoint, or other possible representations.

Transform operation 602 is illustrated in FIG. 6C. Transformation identification module 356 can use initial and final positions of each pair of points to determine a distance. For example, a distance can be determined between the initial left eye position 604 and the initial right eye position 606. Likewise, a distance can be determined between the initial forehead position 608 and the initial mouth position 610. Action acquisition module 352 can determine the conclusion of the action by, for example, a trigger. However, actions can be bounded by time or defined such that they are completed upon completion of a particular gesture by the subject. The transformation identification module 356 can then determine final distances. For example, a final distance can be determined between the final left eye position 614 and the final right eye position 616. Likewise, a final distance can be determined between the final forehead position 618 and the final mouth position. The final distances can be compared with the initial distances to estimate a change in depth and thus used to determine an appropriate transformation of the viewpoint 630. For example, an increase in the relative distances between the pairs of points may correspond to a translation of the viewpoint location towards the 3D layered image or an increase in the viewpoint zoom level. The location of the viewpoint 630 may be represented in program code or pseudocode as camera.z 622.

FIG. 6D, example pseudocode 640 is depicted that portrays one example implementation of transform operation 602 that may be performed by transformation identification module 356. Pseudocode 640 includes two functional groupings. In the first functional grouping 642, labeled OnTrigger, the initial distances between the pairs of points 604, 606 and 608, 610 is determined and the second functional group is executed. In the second functional grouping 644, labeled OnAnimate, horizontal and vertical relative distance changes are determined by subtracting the initial distances from the final distances. Distance change ratios of the relative distances are then compared to pre-determined thresholds to distinguish between depth movement and head rotation. For example, a face may move closer to or further from the camera, or it may rotate (e.g., shake or nod) which may cause changes in the horizontal or vertical distances, but not both. The thresholds may differ for horizontal and vertical relative distance changes because head motion in the horizontal and vertical directions may have different magnitudes. For instance, faces can have a non-square aspect ratio and users may be more likely to shake than nod their head. Finally, the translation is applied by changing the location of the viewpoint, represented by the variable camera.z 622, with an additive displacement factor. In some embodiments, as discussed above, the zoom factor may be a fixed value or it may be a computed value. Other transform operations are possible. For example, the displacement factor may be a multiplicative factor. In some embodiments, the zoom level of the viewpoint is adjusted rather than or in addition to the viewpoint location. In some other embodiments, the viewpoint location may be laterally translated if the change in relative distance is below a preset threshold and lateral translation of the initial and final points is also identified.

D. Voice Command for Viewpoint Location or Direction

Figure 7A:
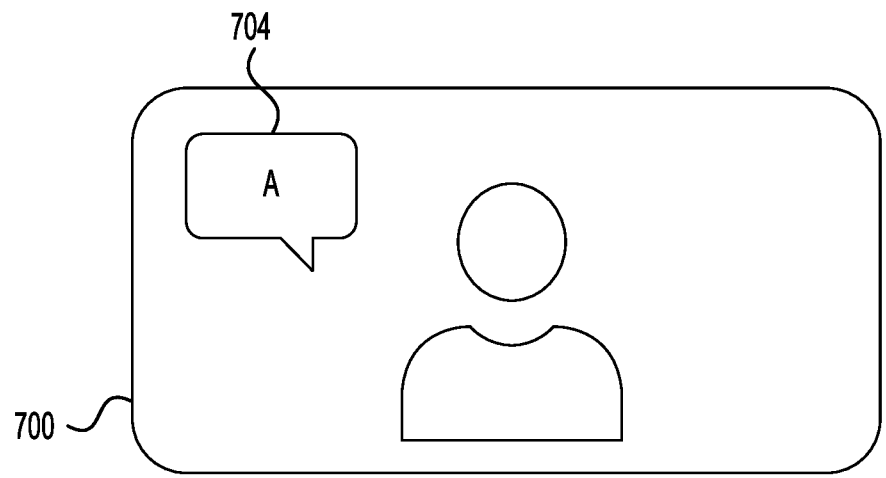
Figure 7B:
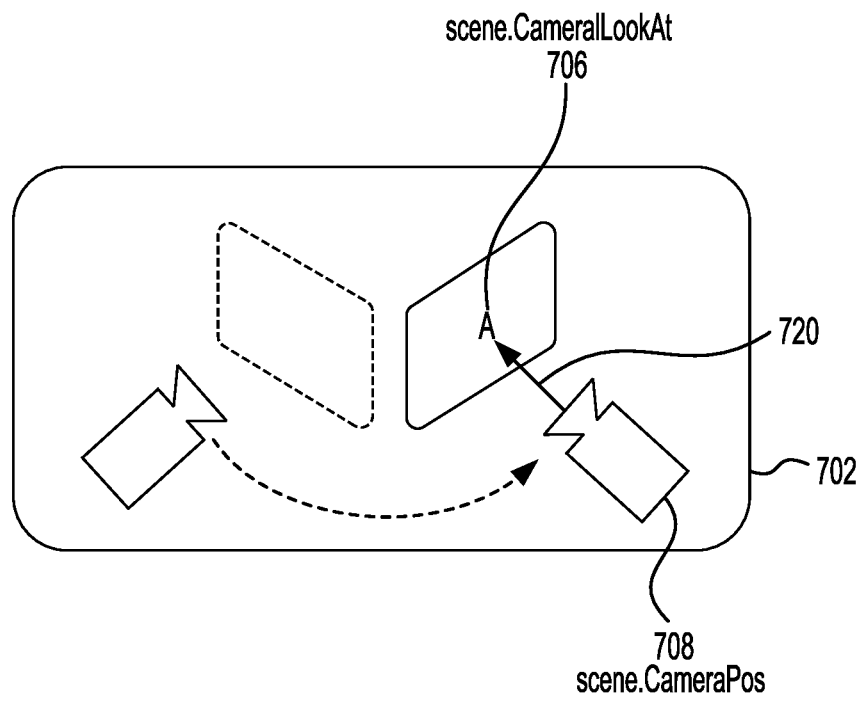

FIGS. 7A-C show illustrations of an action 700 used in some example systems for body-driven interactions in three-dimension layered images, according to some aspects of the present disclosure. The action 700 can relate a voice command mapped to transform operation 702, which may be a change in the location, direction, or zoom level of the viewpoint 720. Following an optional trigger, the subject's voice command can be used to cause a viewpoint change or movement mapped to the voice command. In some embodiments, the voice command itself also acts as a trigger. For example, the action 700 may include the voice command "bedroom" that is mapped to a translation of the viewpoint location to a location in the 3D space that includes a bedroom. In some embodiments, voice commands may be mapped to one of or a combination of changes in viewpoint location, direction, or zoom level.

As shown in FIG. 7A, identification of action 700 may include identification of voice command 704. The action acquisition module 352 may include components configured to recognize speech from the audio stream received from the video capture module 301. In some examples, the audio from the video stream is transcribed and voice commands may be identified from the transcription. The transformation identification module 356 may include one or more mappings of voice commands to viewpoint transformations. Upon identification of voice command 704 by the action acquisition module 352, it may then determine the corresponding transform of viewpoint 720. For example, transformation identification module 356 may include mappings between "bedroom" and the viewpoint location corresponding to the bedroom in 3D space and "kitchen" and the viewpoint location corresponding to the kitchen in 3D space. Mappings may also specify multiple viewpoint changes. For example, the voice command "garage" can be mapped to a viewpoint location and direction.

In some embodiments, voice commands may be automatically mapped based on the context of the 3D layered image. For example, a machine learning model can used to detect objects and/or locations in the 3D layered image. The subject may then cause a transformation of the viewpoint to the direction or location of those objects or locations using a voice command that is automatically mapped. For example, if the 3D layered image contains a mountain and there is no mapping in the transformation identification module 356 associated with the mountain, the machine learning model can identify the mountain and create a mountain. Then, when the subject says "mountain" the viewpoint location can be changed to point at or zoom into the mountain.

FIG. 7B depicts the transform operation 702. In transform operation 702, the voice command 704 causes the viewpoint 720 location 708 to be moved and the direction 706 to be changed, according to a pre-defined mapping in transformation identification module 356. In some examples, voice commands may contain additional information to further define the transform operation. For example, voice commands may specify a direction. For instance, the voice command "garage north" may cause the viewpoint location to change to a location corresponding to a garage in 3D space. The additional configuration information "north" may cause the viewpoint direction to a direction corresponding to the definition of "north" in the 3D space. Other configurations may be used with voice commands. The direction 706 may be represented in program code or pseudocode as scene.CameraLookAt. The location 708 may be represented in program code or pseudocode as scene.CameraPos.

In FIG. 7C, example pseudocode 730 is depicted that portrays one example implementation of transform operation 702 that may be performed by transformation identification module 356. Pseudocode 730 includes two functional groupings. In the first functional grouping 732, labeled OnTrigger, the mapping of voice commands to transform operations is shown using the hashmap (dictionary, associative array, etc.) sceneDefinitions. In this example, the identification of the voice command 704 also acts as the trigger. After identification of the transform operation 702, the second functional grouping 734 is executed. the trigger status is determined. In the second functional grouping 734, labeled OnAnimate, the viewpoint direction 706 and location 708 are updated. Viewpoint direction 706 may be updated using a linear interpolation algorithm (represented by "lerp") between the current viewpoint location and the final viewpoint location identified in the mapping. For some examples involving large rotations (e.g. 90 degrees or more) linear interpolation is insufficient and spherical linear interpolation is necessary. Likewise, the viewpoint direction is updated to the final viewpoint direction identified in the mapping. In this example psuedocode 730, the value identified using the mapping, SceneSpec, is an object that can represent, among other things, viewpoint 720. The viewpoint direction 706 and location 708 are attributes of the SceneSpec object.

V. PROCESS FOR EMPLOYING BODY-DRIVEN INTERACTIONS IN THREE-DIMENSION LAYERED IMAGES

Figure 8:
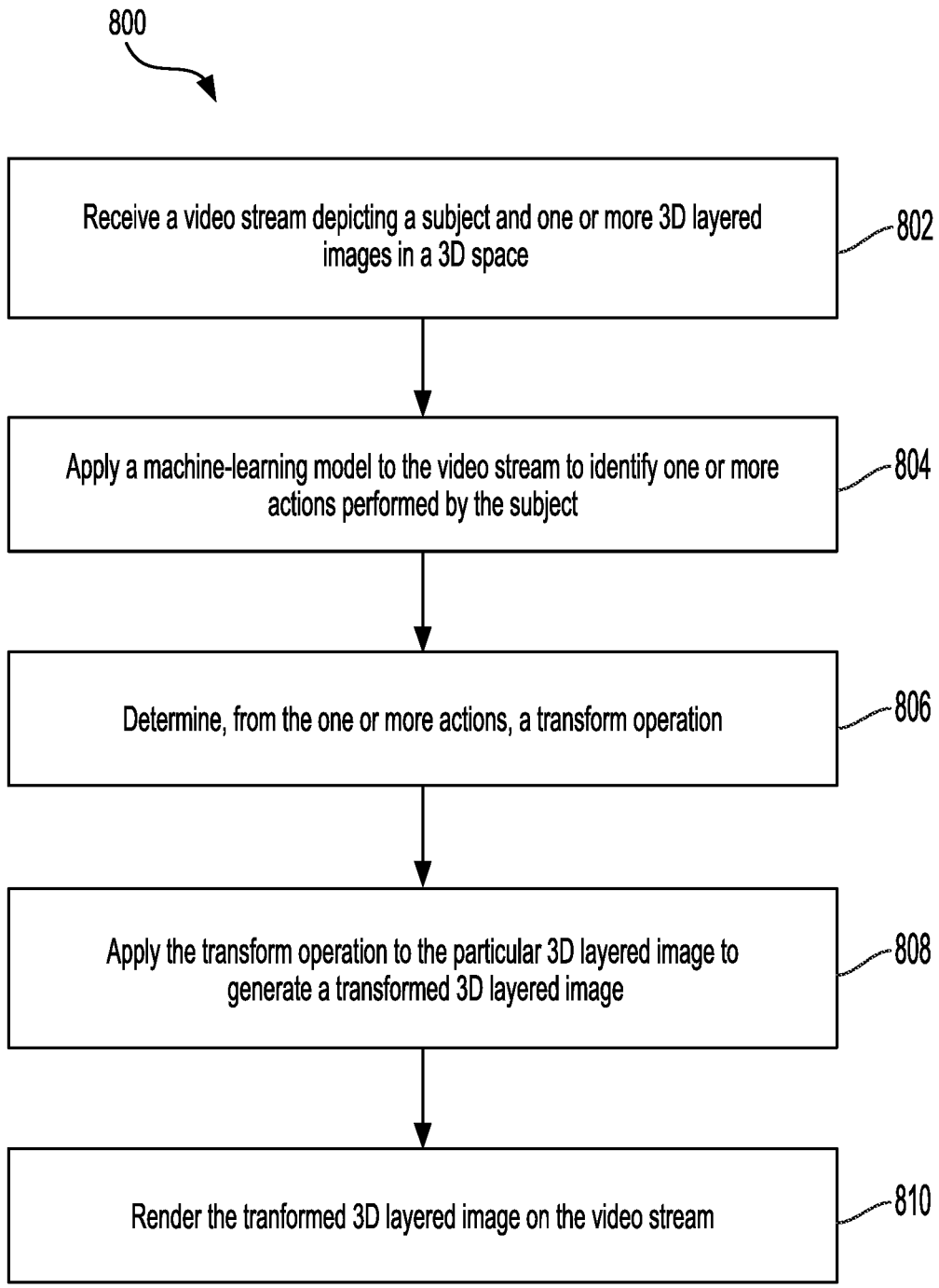
FIG. 8 illustrates an example process for employing body-driven interactions in 3D layered images.

FIG. 8 illustrates an example process 800 for employing body-driven interactions in three-dimension layered images. For illustrative purposes, the process 800 is described with reference to the components illustrated in FIG. 3, though other implementations are possible. For example, the video editor 302, the display device 322, and other components of the video capture module 301 may be included in the video processing module 350 in some implementations.

At block 802, a video capture module receives a video stream being presented on a display device. The video stream depicts a subject and one or more 3D layered images in a 3D space and each 3D layered image has an associated viewpoint. Each viewpoint has a location, a direction, and a zoom level in the 3D space. In one example embodiment, the subject is captured in front of a green screen or similar chroma keyed background. The 3D layered images are rendered by the rendering engine 362 and overlayed onto the video stream by the video editor 302. The 3D layered image is rendered from the perspective of the associated viewpoint, which may have various properties. Some example properties include a location, a direction, zoom level, and orientation, among other possible viewpoint properties. The video stream including the subject and the 3D layered image together can create an impression of the subject embedded in the 3D layered image in the 3D space.

At block 804, a video processing module applies a machine-learning model to the video stream to identify one or more actions performed by the subject. In some embodiments, the action acquisition module 352 receives video stream and motion capture information from the video capture module 301. The action acquisition module 352 may include a machine learning model 354 that can identify actions by the subject. For example, the machine learning model 354 may be trained to identify actions using supervised training with labeled training data and a classification model. For instance, an adaptive naive Bayes Classifier may be used. In some examples, the action may be preceded by a trigger. For instance, the subject may use a remote control, clicker, voice command, or other suitable trigger to demarcate the beginning of the action. The machine learning model 354 can then use as input those video frames following the trigger for determination of the action.

At block 806, the video processing module 350 determines, from the one or more actions, a transform operation to a particular 3D layered image of the one or more 3D layered images. For example, the video processing module 350 may include a transformation identification module 356 that includes a mapping of actions to viewpoint transform operations. The particular 3D image has a first viewpoint, which the transform operation updates to a second viewpoint. Updating the first viewpoint includes at least one of changing the zoom level of the first viewpoint to a zoom level of the second viewpoint; moving the location of the first viewpoint to a location of the second viewpoint; and changing the direction of the first viewpoint to a direction of the second viewpoint. Other transformation operations are also possible, such as reflection, shearing, the addition of filters, etc.

In some examples, the same action may be mapped to different viewpoint transform operations. In that case, actions can be distinguished by association with a particular trigger. For example, a pinch to zoom action can be associated with both a viewpoint zoom level change and viewpoint location displacement. The pinch to zoom action can be preceded by an indication from a remote control. The remote control may have two buttons, one corresponding to a location change and one corresponding to a zoom level change.

At block 808, the video processing module 350 applies the transform operation to the particular 3D layered image to generate a transformed 3D layered image, in which the transformed 3D layered image is configured to be rendered from the perspective of the second viewpoint. For example, the video processing module 350 may include a transformation engine 358 which can use one or more mathematical operations to transform the viewpoint. The viewpoint can be transformed from an initial configuration to a final configuration. In some embodiments, the transformation engine 358 may transform the viewpoint over a series of iterative steps between the initial and final configuration to generate a smooth animation or transition.

At block 810, the video processing module 350 renders the transformed 3D layered image on the video stream. For example, the video processing module 350 may include a rendering engine 362 that receives 3D layered image assets 360 from a memory device. The rendering engine 362 receives information about the transformed viewpoint configuration, or a series of steps affecting such transformation. The rendering engine 362 can then render the particular 3D layered image from the perspective of the transformed viewpoint(s) and overlay the re-rendered particular 3D layered image onto the video frames containing the subject. In some embodiments, the overlaying of the 3D layered image onto the video frames containing the subject may be performed by the video editor 302.

The re-rendered particular 3D layered image can then be displayed onto display device 322. For example, the display device 322 may cause a viewer to have the impression that the subject's pinch to zoom motion caused a virtual camera capturing the 3D scene including the particular 3D layered image to move towards the subject or change zoom level, zooming into the subject.

VI. EXAMPLE OF A COMPUTING ENVIRONMENT

Figure 9:
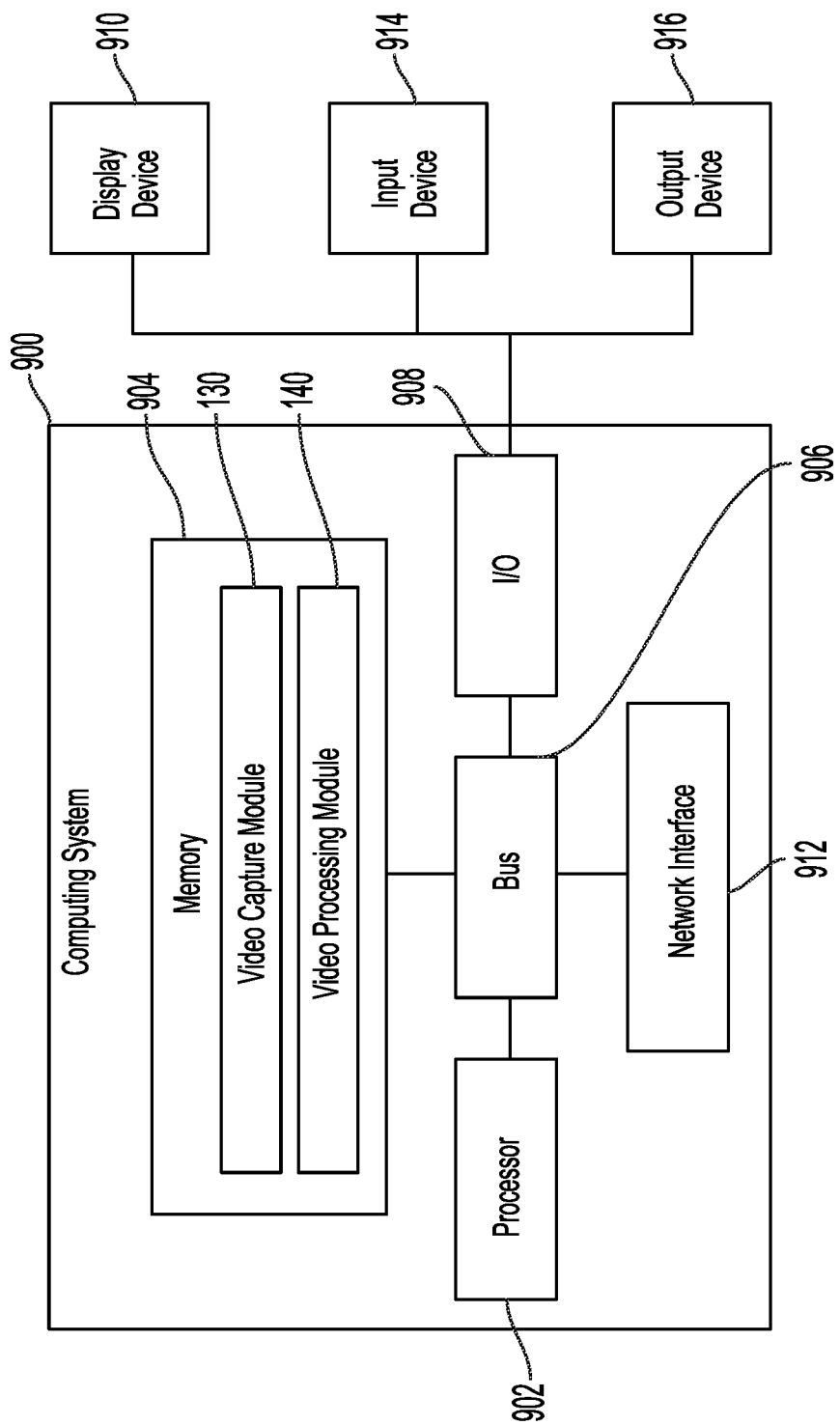
FIG. 9 depicts a computing system that can implement body-driven interactions in 3D layered images.

Any suitable computing system or group of computing systems can be used for performing the operations described herein. For example, FIG. 9 depicts a computing system 900 that can implement any of the computing systems or environments discussed above. In some embodiments, the computing system 900 includes a processing device 902 that executes the video capture module 130 and the video processing module 140, a memory that stores various data computed or used by the video capture module 130 and the video processing module 140, an input device 914 (e.g., a mouse, a stylus, a touchpad, a touchscreen), and an output device 916 that presents output to a user (e.g., a display device that displays graphical content generated by the video capture module 130 and the video processing module 140). For illustrative purposes, FIG. 9 depicts a single computing system on which the video capture module 130 and the video processing module 140 are executed, and the input device 914 and output device 916 are present. But these applications, datasets, and devices can be stored or included across different computing systems having devices similar to the devices depicted in FIG. 9.

The example of FIG. 9 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory, machine-readable storage medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 900 may also include a number of external or internal devices, such as a display device 910, or other input or output devices. For example, the computing system 900 is shown with one or more input/output ("I/O") interfaces 908. An I/O interface 908 can receive input from input devices or provide output to output devices. One or more buses 906 are also included in the computing system 900. Each bus 906 communicatively couples one or more components of the computing system 900 to each other or to an external component.

The computing system 900 executes program code that configures the processing device 902 to perform one or more of the operations described herein. The program code includes, for example, code implementing the video capture module 130 and the video processing module 140 or other suitable applications that perform one or more operations described herein. The program code may be resident in the memory device 904 or any suitable computer-readable medium and may be executed by the processing device 902 or any other suitable processor. In some embodiments, all modules in the video capture module 130 and the video processing module 140 are stored in the memory device 904, as depicted in FIG. 9. In additional or alternative embodiments, one or more of these modules from the video capture module 130 and the video processing module 140 are stored in different memory devices of different computing systems.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices (e.g., a computing device that receives inputs for video capture module 130 and video processing module 140 or displays outputs of video capture module 130 and video processing module 140) via a data network using the network interface device 912.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. An output device 916 can include any device or group of devices suitable for providing visual, auditory, or other suitable sensory output. Non-limiting examples of the output device 916 include a touchscreen, a monitor, a separate mobile computing device, etc.

Although FIG. 9 depicts the input device 914 and the output device 916 as being local to the computing device that executes the video capture module 130 and the video processing module 140, other implementations are possible. For instance, in some embodiments, one or more of the input devices 914 and output devices 916 include a remote client-computing device that communicates with the computing system 900 via the network interface device 912 using one or more data networks described herein.

VII. GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
   receiving, by a video capture module, a video stream being presented on a display device, the video stream depicting a subject and one or more three-dimensional (3D) layered images in a 3D space, each 3D layered image comprising one or more two dimensional (2D) layers and having an associated viewpoint, each viewpoint having a location, a direction, and a zoom level in the 3D space;
   applying, by a video processing module, a machine-learning model to the video stream to identify one or more actions performed by the subject superimposed or embedded within a particular 3D layered image of the one or more 3D layered images;
   determining, from the one or more actions, a transform operation to the particular 3D layered image, the particular 3D layered image having a first viewpoint, wherein the transform operation updates the first viewpoint to a second viewpoint, wherein updating the first viewpoint includes at least one of:
      changing the zoom level of the first viewpoint to a zoom level of the second viewpoint;
      moving the location of the first viewpoint to a location of the second viewpoint; and
      changing the direction of the first viewpoint to a direction of the second viewpoint;
   applying the transform operation to the particular 3D layered image to generate a transformed 3D layered image, wherein the transformed 3D layered image is configured to be rendered from the perspective of the second viewpoint; and
   rendering the transformed 3D layered image on the video stream.

2. The method of claim 1, further comprising:
   identifying, by the video processing module, a trigger, wherein:
      the trigger precedes the identification of the one or more actions performed by the subject; and
      the trigger causes the machine-learning model to identify an action of the subject.

3. The method of claim 2, wherein the trigger is an input device communicatively coupled with the video processing module.

4. The method of claim 2, wherein the trigger is a voice command.

5. The method of claim 1, wherein the one or more actions comprise a change in distance between a subject's hands and wherein the transform operation comprises:
   changing the zoom level of the first viewpoint, the change in zoom level corresponding to the difference between a first distance between the subject's hands and a second distance between the subject's hands.

6. The method of claim 1, wherein the one or more actions comprise a change in position of a subject's head and wherein the transform operation comprises:
   changing the direction of the first viewpoint, the change in direction corresponding to the orientation of the subject's head.

7. The method of claim 1, wherein the one or more actions comprise:
   a change in a first distance on a subject's body; and
   a change in a second distance on the subject's body;
   and wherein the transform operation comprises:
   changing the zoom level of the first viewpoint, the change in zoom level corresponding to the difference between the first distance on the subject's body and the second distance on the subject's body.

8. The method of claim 7, wherein the one or more actions further comprise determining a distance change ratio and wherein the changing the zoom level of the first viewpoint is responsive to the distance change ratio exceeding a pre-set threshold.

9. The method of claim 1, wherein the video processing module is further configured to receive a set of mappings, the mappings relating a set of voice commands to a set of viewpoint locations, directions, and zoom levels, and wherein:
   the one or more actions comprise a voice command from the subject; and
   the transform operation comprises at least one of:
      changing the direction of the first viewpoint, the change in direction corresponding to the mappings; and
      changing the location of the first viewpoint, the change in direction corresponding to the mappings.

10. A system comprising:
    a video capture module configured to:
       receive a video stream being presented on a display device, the video stream depicting a subject and one or more three-dimensional (3D) layered images in a 3D space, each 3D layered image comprising one or more 2D layers and having an associated viewpoint, each viewpoint having a location, a direction, and a zoom level in the 3D space; and
    a video processing module configured to:
       apply a machine-learning model to the video stream to identify one or more actions performed by the subject superimposed or embedded within a particular 3D layered image of the one or more 3D layered images;
       determine, from the one or more actions, a transform operation to the particular 3D layered image, the particular 3D layered image having a first viewpoint, wherein the transform operation updates the first viewpoint to a second viewpoint, wherein updating the first viewpoint includes at least one of:
  changing the zoom level of the first viewpoint to a zoom level of the second viewpoint;
  moving the location of the first viewpoint to a location of the second viewpoint; and
  changing the direction of the first viewpoint to a direction of the second viewpoint;
apply the transform operation to the particular 3D layered image to generate a transformed 3D layered image, wherein the transformed 3D layered image is configured to be rendered from the perspective of the second viewpoint; and
render the transformed 3D layered image on the video stream.

11. The system of claim 10, wherein the video processing module is further configured to:
identify a trigger, wherein:
  the trigger precedes the identification of the one or more actions performed by the subject; and
  the trigger causes the machine-learning model to identify an action of the subject.

12. The system of claim 10, wherein the one or more actions comprise a change in distance between a subject's hands and wherein the transform operation comprises:
changing the zoom level of the first viewpoint, the change in zoom level corresponding to the difference between a first distance between the subject's hands and a second distance between the subject's hands.

13. The system of claim 10, wherein the one or more actions comprise a change in position of a subject's head and wherein the transform operation comprises:
changing the direction of the first viewpoint, the change in direction corresponding to the orientation of the subject's head.

14. The system of claim 10, wherein the one or more actions comprise:
a change in a first distance on a subject's body; and
a change in a second distance on the subject's body;
and wherein the transform operation comprises:
changing the zoom level of the first viewpoint, the change in zoom level corresponding to the difference between the first distance on the subject's body and the second distance on the subject's body.

15. The system of claim 10, wherein the video processing module is further configured to receive a set of mappings, the mappings relating a set of voice commands to a set of viewpoint locations, directions, and zoom levels, and wherein:
the one or more actions comprise a voice command from the subject; and
the transform operation comprises at least one of:
  changing the direction of the first viewpoint, the change in direction corresponding to the mappings; and
  changing the location of the first viewpoint, the change in direction corresponding to the mappings.

16. A computer program product tangibly embodied in a non-transitory machine-readable storage medium including instructions configured to cause one or more processing devices to perform actions including:
receiving a video stream being presented on a display device, the video stream depicting a subject and one or more three-dimensional (3D) layered images in a 3D space, each 3D layered image comprising one or more 2D layers and having an associated viewpoint, each viewpoint having a location, a direction, and a zoom level in the 3D space;
applying a machine-learning model to the video stream to identify one or more actions performed by the subject superimposed or embedded within a particular 3D layered image of the one or more 3D layered images;
determining, from the one or more actions, a transform operation to the particular 3D layered image, the particular 3D layered image having a first viewpoint, wherein the transform operation updates the first viewpoint to a second viewpoint, wherein updating the first viewpoint includes at least one of:
  changing the zoom level of the first viewpoint to a zoom level of the second viewpoint;
  moving the location of the first viewpoint to a location of the second viewpoint; and
  changing the direction of the first viewpoint to a direction of the second viewpoint;
applying the transform operation to the particular 3D layered image to generate a transformed 3D layered image, wherein the transformed 3D layered image is configured to be rendered from the perspective of the second viewpoint; and
rendering the transformed 3D layered image on the video stream.

17. The computer program product of claim 16, wherein the one or more actions comprise a change in distance between a subject's hands and wherein the transform operation comprises:
changing the zoom level of the first viewpoint, the change in zoom level corresponding to the difference between a first distance between the subject's hands and a second distance between the subject's hands.

18. The computer program product of claim 16, wherein the one or more actions comprise a change in position of a subject's head and wherein the transform operation comprises:
changing the direction of the first viewpoint, the change in direction corresponding to the orientation of the subject's head.

19. The computer program product of claim 16, wherein the one or more actions comprise:
a change in a first distance on a subject's body; and
a change in a second distance on the subject's body;
and wherein the transform operation comprises:
changing the zoom level of the first viewpoint, the change in zoom level corresponding to the difference between the first distance on the subject's body and the second distance on the subject's body.

20. The computer program product of claim 16, including further instructions to receive a set of mappings, the mappings relating a set of voice commands to a set of viewpoint locations, directions, and zoom levels, and wherein:
the one or more actions comprise a voice command from the subject; and
the transform operation comprises at least one of:
  changing the direction of the first viewpoint, the change in direction corresponding to the mappings; and
  changing the location of the first viewpoint, the change in direction corresponding to the mappings.

* * * * *